(12) United States Patent
Bodine et al.

(10) Patent No.: US 11,377,772 B2
(45) Date of Patent: Jul. 5, 2022

(54) LAUNDRY APPLIANCE

(71) Applicant: WHIRLPOOL CORPORATION, Benton Harbor, MI (US)

(72) Inventors: Darryl C. Bodine, St. Joseph, MI (US); Gregg P. Fitzgerald, Eau Claire, MI (US); Stephen D. Ostdiek, St. Joseph, MI (US); Marcel Schmidt, Poprad (SK); Todd J. Tunzi, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 56 days.

(21) Appl. No.: 16/835,747

(22) Filed: Mar. 31, 2020

(65) Prior Publication Data
US 2020/0370233 A1  Nov. 26, 2020

Related U.S. Application Data

(60) Provisional application No. 62/851,938, filed on May 23, 2019.

(51) Int. Cl.
| | |
|---|---|
| *D06F 34/28* | (2020.01) |
| *D06F 34/26* | (2020.01) |
| *D06F 34/24* | (2020.01) |
| *D06F 39/08* | (2006.01) |
| *G10L 15/22* | (2006.01) |
| *D06F 37/04* | (2006.01) |
| *D06F 37/26* | (2006.01) |
| *D06F 39/06* | (2006.01) |
| *D06F 39/14* | (2006.01) |
| *D06F 103/66* | (2020.01) |
| *D06F 33/00* | (2020.01) |

(52) U.S. Cl.
CPC .............. *D06F 34/28* (2020.02); *D06F 34/24* (2020.02); *D06F 34/26* (2020.02); *D06F 37/04* (2013.01); *D06F 37/266* (2013.01); *D06F 39/06* (2013.01); *D06F 39/083* (2013.01); *D06F 39/14* (2013.01); *G10L 15/22* (2013.01); *D06F 33/00* (2013.01); *D06F 2103/66* (2020.02)

(58) Field of Classification Search
CPC ...................................................... D06F 34/28
See application file for complete search history.

(56) References Cited

U.S. PATENT DOCUMENTS

| | | | |
|---|---|---|---|
| 3,498,089 A | 3/1970 | Miller et al. | |
| 7,398,662 B2 | 7/2008 | Kim et al. | |
| 7,614,263 B2 | 11/2009 | Kim et al. | |
| 8,033,145 B2 | 10/2011 | Komori | |
| 8,464,560 B2 | 6/2013 | Kim et al. | |

(Continued)

FOREIGN PATENT DOCUMENTS

| | | |
|---|---|---|
| CN | 103911812 B | 2/2016 |
| CN | 107401030 A | 11/2017 |

(Continued)

*Primary Examiner* — Jason Y Ko
(74) *Attorney, Agent, or Firm* — Price Heneveld LLP

(57) ABSTRACT

A laundry appliance includes a cabinet that has a front panel. A tub is positioned within the cabinet. A door is coupled to the front panel of the cabinet. The door moves vertically between a closed position and an opened position. A bellows assembly is coupled to the front panel. The bellows assembly extends between the cabinet and the tub. A sealing assembly includes a first seal and a second seal that are each coupled to the bellows assembly.

8 Claims, 22 Drawing Sheets

(56) References Cited

U.S. PATENT DOCUMENTS

| | | | |
|---|---|---|---|
| 8,464,561 | B2 | 6/2013 | Brinkmann |
| 9,045,853 | B2 | 6/2015 | Kim et al. |
| 9,051,679 | B2 | 6/2015 | Kwon et al. |
| 9,637,855 | B2 | 5/2017 | Buso et al. |
| 9,869,048 | B2 | 1/2018 | Burgess et al. |
| 10,105,032 | B2 | 10/2018 | Wilson |
| 10,373,770 | B2 | 8/2019 | Bodine et al. |
| 10,422,064 | B2 | 9/2019 | Seong et al. |
| 10,585,407 | B2 | 3/2020 | Bodine et al. |
| 2007/0295037 | A1 | 12/2007 | Blomberg et al. |
| 2008/0289369 | A1 | 11/2008 | Noguchi |
| 2018/0092507 | A1 | 4/2018 | Wilson |

FOREIGN PATENT DOCUMENTS

| | | | |
|---|---|---|---|
| CN | 207193607 U | 4/2018 | |
| CN | 208266517 U | 12/2018 | |
| DE | 102018101299 A1 | 7/2019 | |
| EP | 1367169 A1 | 12/2003 | |
| EP | 1595992 A1 | 11/2005 | |
| EP | 1650339 A1 | 4/2006 | |
| EP | 1408150 B1 | 3/2008 | |
| EP | 1367169 B1 | 2/2010 | |
| EP | 1961856 B1 | 6/2010 | |
| EP | 2824231 A1 | 1/2015 | |
| EP | 3290572 A1 | 3/2018 | |
| JP | 2009118948 A | 6/2009 | |
| WO | 2014037840 A1 | 3/2014 | |

LAUNDRY APPLIANCE

CROSS-REFERENCE TO RELATED APPLICATIONS

This application claims priority to U.S. patent application Ser. No. 62/851,938, filed on May 23, 2019, entitled "LAUNDRY APPLIANCE," the disclosure of which is hereby incorporated herein by reference in its entirety.

FIELD OF THE DISCLOSURE

The present disclosure generally relates to a laundry appliance, and more specifically, to a laundry appliance having a bellows wash assembly.

BACKGROUND OF THE DISCLOSURE

Washers generally include bellows disposed between a cabinet and a tub positioned within the cabinet. The bellows allow the tub to move independently of the cabinet. Additionally, washers typically have doors rotatably coupled to the cabinet. The doors are operable between a closed position, sealing the front opening, and an opened position for accessing the drum.

SUMMARY OF THE DISCLOSURE

According to one aspect of the present disclosure, a laundry appliance includes a cabinet that has a front panel. A tub is positioned within the cabinet. A door is coupled to the front panel of the cabinet. The door moves vertically between a closed position and an opened position. A bellows assembly is coupled to the front panel. The bellows assembly extends between the cabinet and the tub. A sealing assembly includes a first seal and a second seal that are each coupled to the bellows assembly.

According to another aspect of the present disclosure, a laundry appliance includes a cabinet that defines a front opening in a front panel thereof. A tub is disposed within the cabinet. A bracket is coupled to the front panel proximate the front opening. A door is rotatably coupled to the cabinet via the bracket. The door is operable along an arced path through a single plane between opened and closed positions. The single plane is parallel to the front panel.

According to yet another aspect of the present disclosure, a laundry appliance includes a cabinet. A tub is positioned within the cabinet. A bellows assembly extends between the cabinet and the tub. A bellows wash assembly is disposed proximate an upper portion of the bellows assembly. The bellows wash assembly is configured to dispense water on an interior surface of the bellows assembly.

These and other features, advantages, and objects of the present disclosure will be further understood and appreciated by those skilled in the art by reference to the following specification, claims, and appended drawings.

Figure 1:
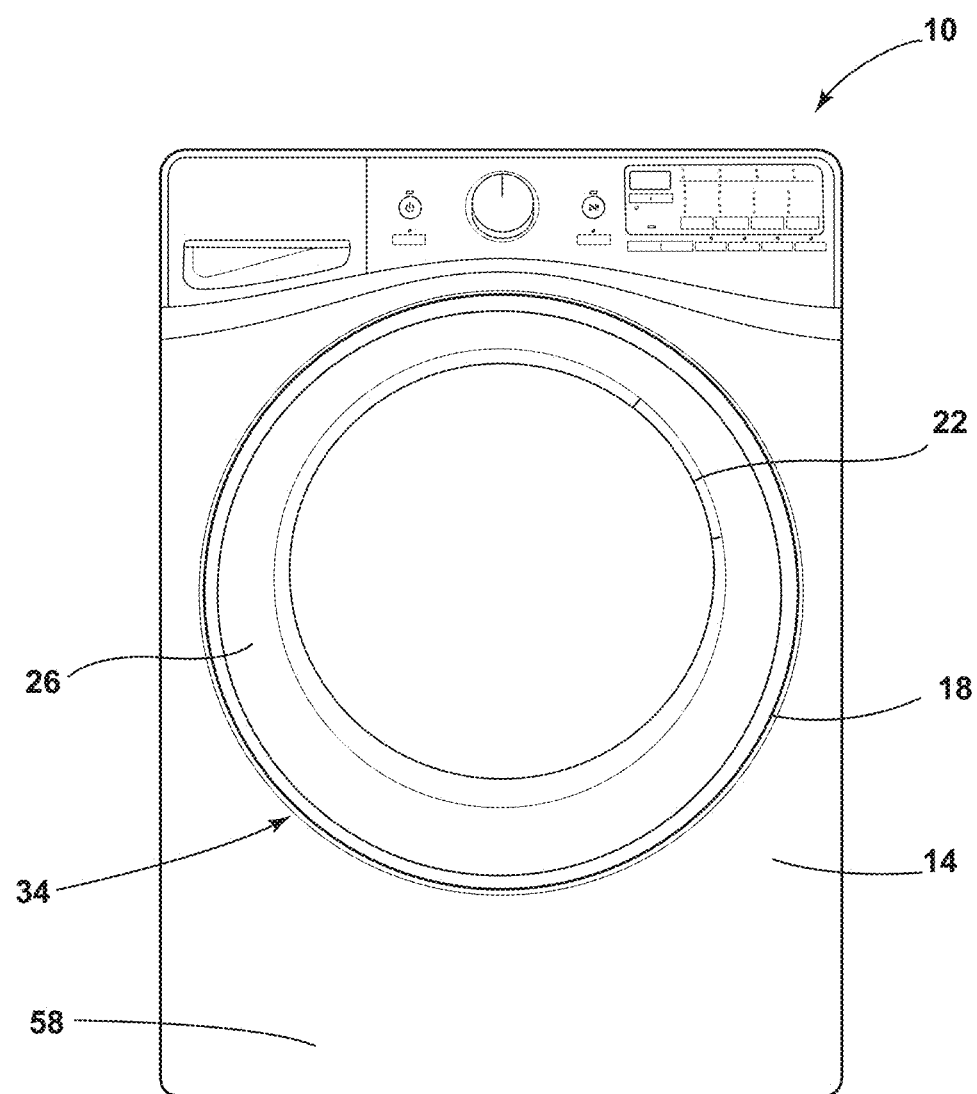
FIG. 1 is a front elevational view of a laundry appliance with a door in a closed position, according to one example.

The components in the figures are not necessarily to scale, emphasis instead being placed upon illustrating the principles described herein.

DETAILED DESCRIPTION

The present illustrated embodiments reside primarily in combinations of method steps and apparatus components related to a laundry appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-22, reference numeral 10 generally designates a laundry appliance that includes a cabinet 14 defining a front opening 18. A tub 20 is positioned within the cabinet 14. A drum 22 is positioned within the tub 20 and is accessible via the front opening 18. A door 26 is operably coupled to the cabinet 14 and operable between an opened position 30 and a closed position 34. The door 26 is configured to seal the front opening 18 when in the closed position 34. A bellows assembly 42 is disposed proximate the front opening 18 between the cabinet 14 and the tub 20. A bellows wash assembly 46 is disposed proximate an upper portion 50 of the bellows assembly 42 for dispensing water along an interior surface 54 of the bellows assembly 42.

Figure 2:
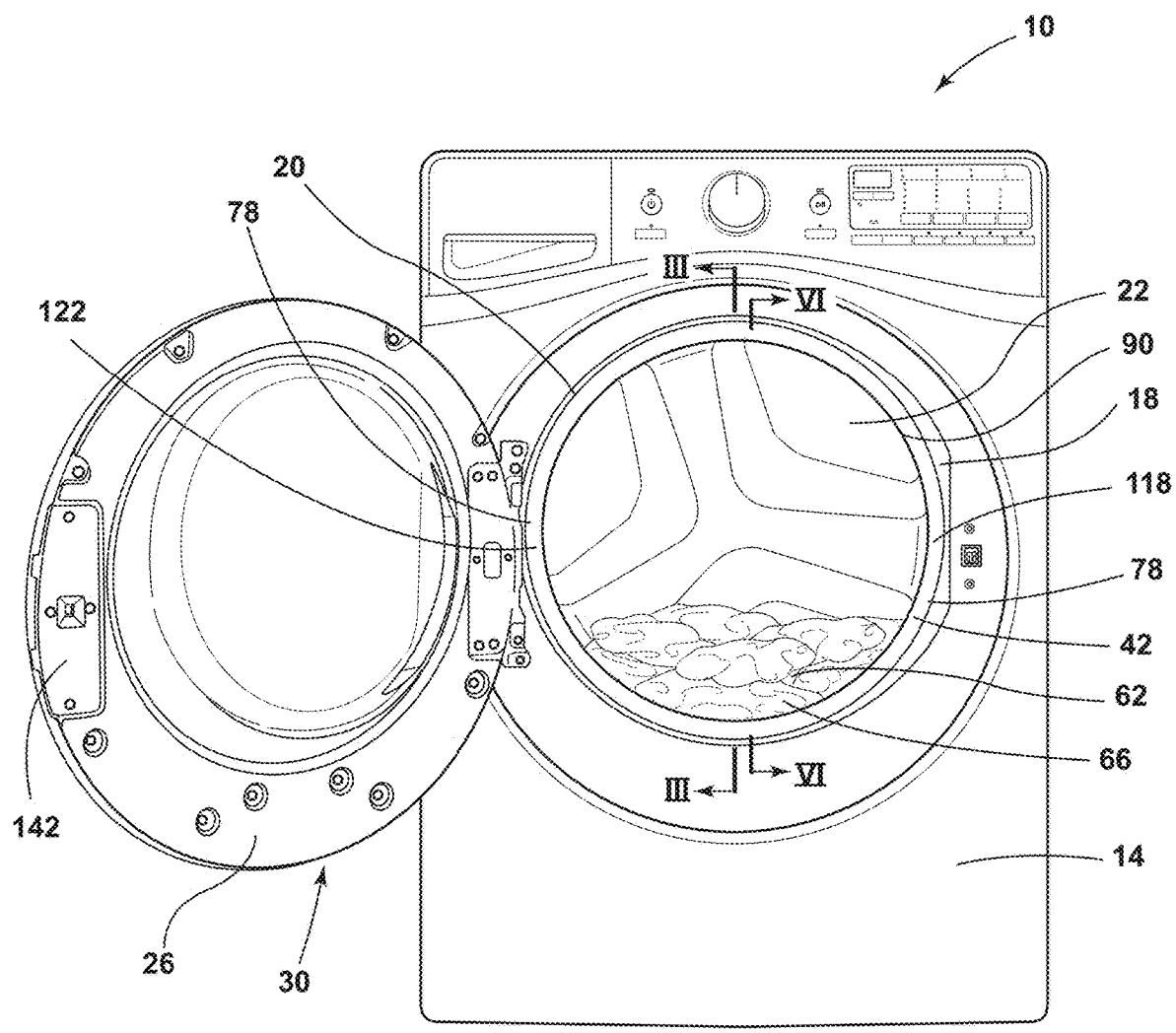
FIG. 2 is a front elevational view of the laundry appliance of FIG. 1 with the door in an opened position.

Referring to FIGS. 1 and 2, the laundry appliance 10 includes the cabinet 14 defining the front opening 18 in a front panel 58 thereof. The tub 20 is disposed within the cabinet 14 and defines an access opening 62, which is generally aligned with the front opening 18 of the cabinet 14. Accordingly, the tub 20 is typically accessed by a user via the front opening 18 and the access opening 62, respectively.

The laundry appliance 10 is illustrated as a front-load washer, however, the laundry appliance 10 may also be a top-load washer, a dryer, a combination washer/dryer, or other laundry appliance 10. The door 26 is operably coupled to the cabinet 14 for sealing the front opening 18 when in the closed position 34 and allowing access to the tub 20 and the drum 22 when in the opened position 30. As illustrated in FIGS. 1 and 2, the door 26 is a swing or hinged door rotatably coupled to the cabinet 14. In such examples, the door 26 can be a flat panel hinged door or a fishbowl-style hinged door. It is also contemplated that the door 26 can be a sliding door 26, as exemplified in FIGS. 8-22, which can move horizontally and/or vertically, without departing from the teachings herein.

Figure 3:
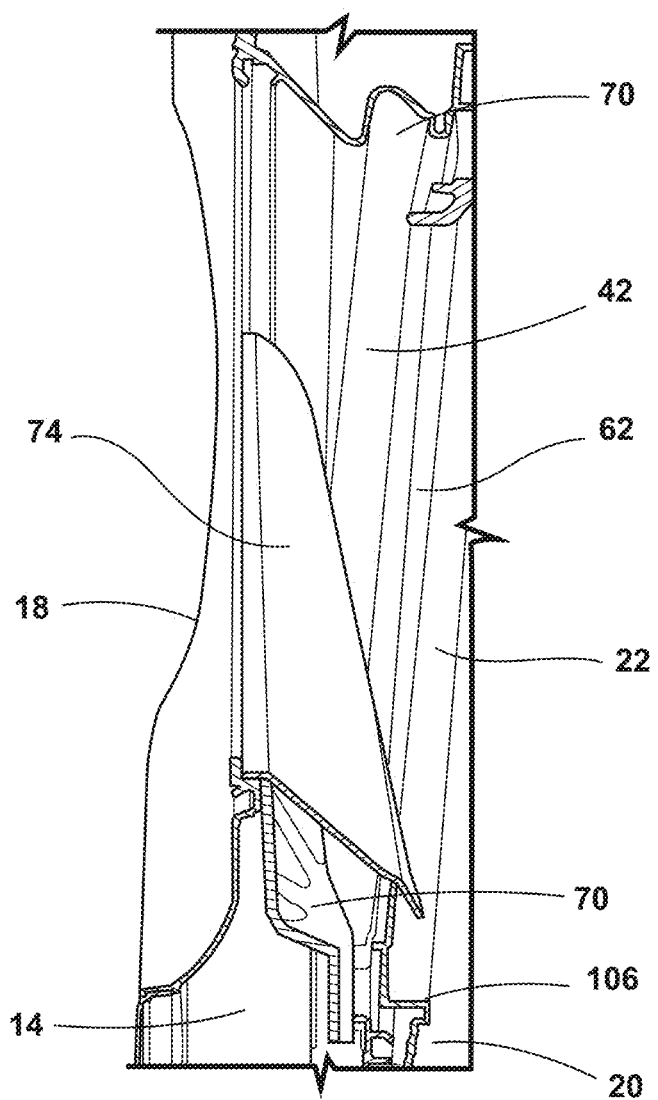
FIG. 3 is a partial cross-sectional view of a bellows assembly and a deflector in the laundry appliance of FIG. 2 taken at line III-III.
Figure 4:
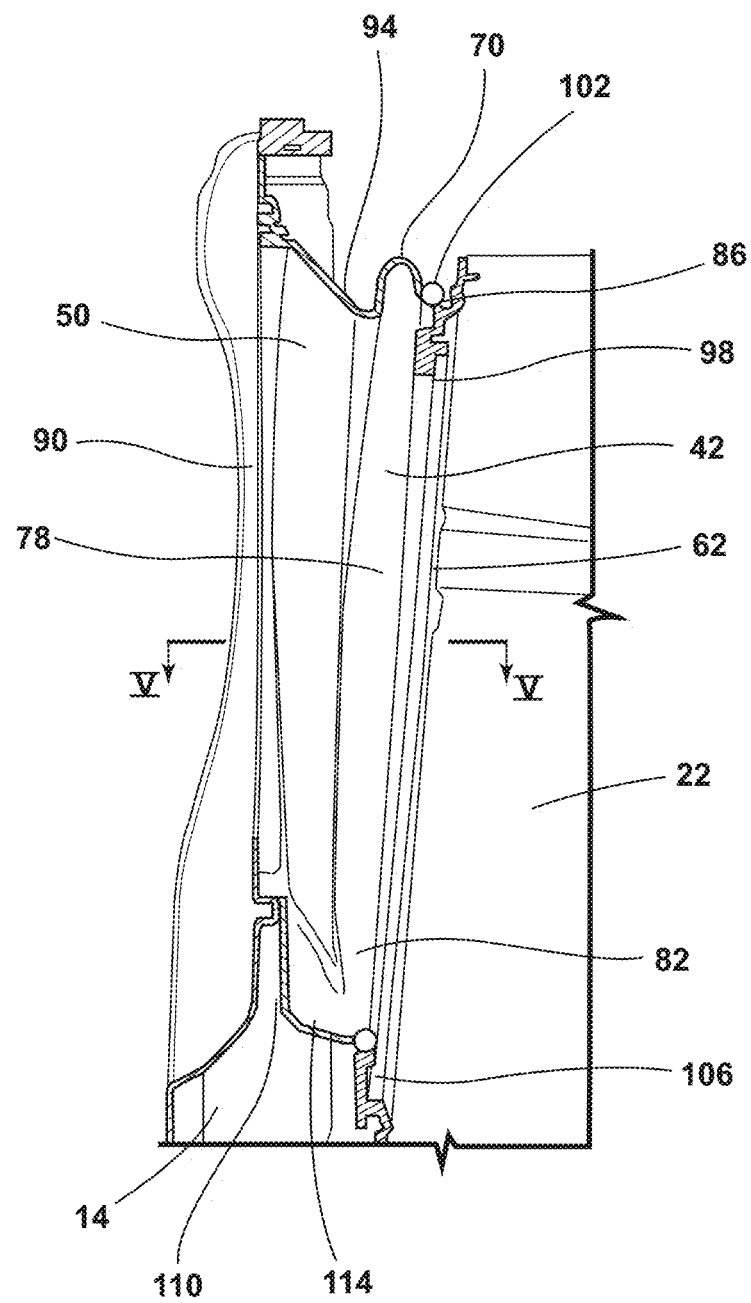
FIG. 4 is a partial cross-sectional view of the bellows assembly in the laundry appliance of FIG. 3 with the deflector removed.
Figure 5:
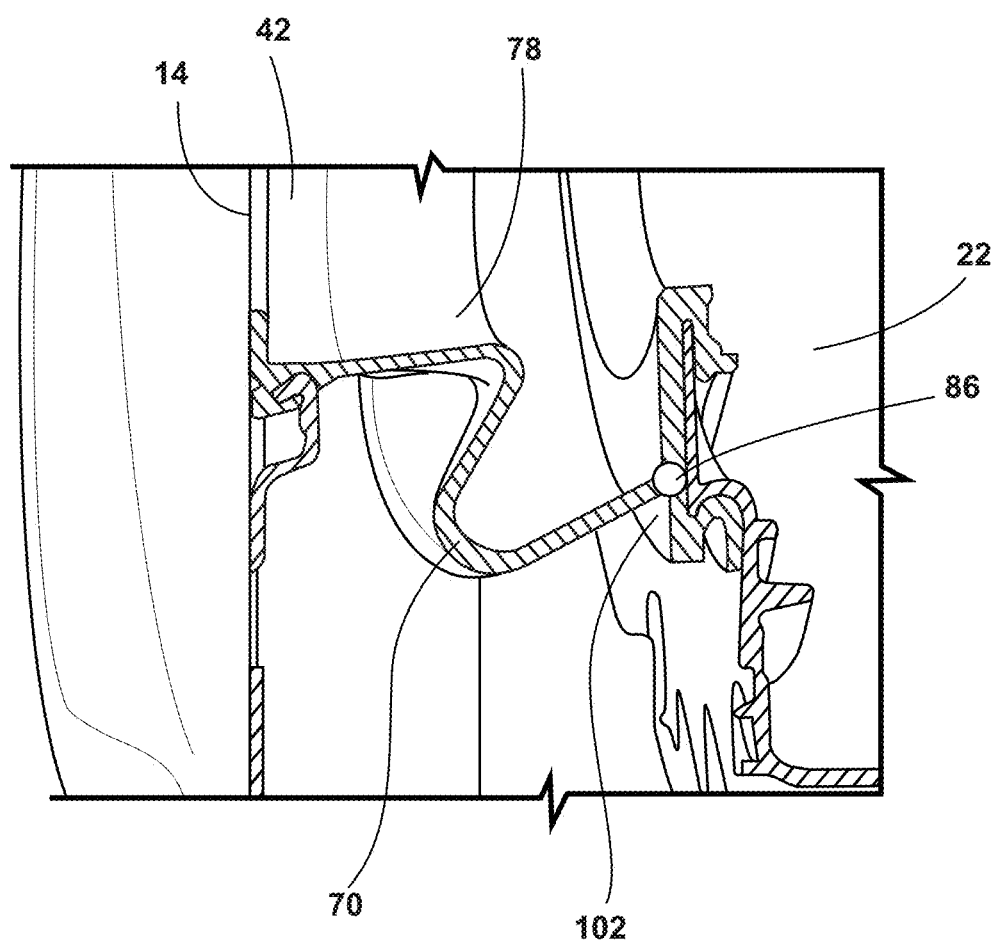
FIG. 5 is a partial cross-sectional view of the bellows assembly of FIG. 4 taken along line V-V.

Referring to FIGS. 2 and 3, the bellows assembly 42 is disposed adjacent to the front opening 18 of the cabinet 14. The bellows assembly 42 is typically coupled to the cabinet 14 along a perimeter of the front opening 18. Further, the bellows assembly 42 is also typically coupled to the tub 20 along a perimeter of the access opening 62. Accordingly, the bellows assembly 42 extends between the cabinet 14 and the tub 20. Typically, the bellows assembly 42 extends around the entire perimeter of the front opening 18 and the access opening 62. However, it is contemplated that the bellows assembly 42 can extend partially around the perimeter of at least one of the front opening 18 and the access opening 62.

In various examples, the tub 20 and the drum 22 may be positioned at an angle within the cabinet 14. As such, the access opening 62 can be offset from the front opening 18. Accordingly, the bellows assembly 42 can be an obliquely-oriented bellows. The bellows assembly 42 can be configured to form an oblique cylinder or frusto-conical shape that defines a downward angle between the front opening 18 and the access opening 62 of the offset tub 20. The bellows assembly 42 is advantageous for retaining laundry 66 within the tub 20 during a laundry cycle. In such configurations, the bellows assembly 42 can form a sloped surface to direct water into the drum 22. The bellows assembly 42 is typically configured as a flexible gasket having a plurality of folds 70. The flexibility of the bellows assembly 42 and the folds 70 permit the tub 20 to move substantially independent of the cabinet 14.

Referring to FIGS. 2 and 3, the laundry appliance 10 can include a deflector 74 disposed proximate the bellows assembly 42. In examples having the deflector 74, the deflector 74 extends at least partially around the perimeter of the front opening 18 of the cabinet 14, but can also extend around the entire perimeter. The deflector 74 is coupled to the cabinet 14 and extends over the bellows assembly 42, partially through the access opening 62, and into the drum 22. The deflector 74 is advantageous for deflecting laundry 66 away from the bellows assembly 42 and into the drum 22. The deflector 74 is also advantageous for protecting the bellows assembly 42 from laundry 66 contacting the bellows assembly 42, which can result in premature wear of the bellows assembly 42. The deflector 74 can be utilized in conjunction with a sliding-type door 26 and/or a hinged-type door 36 to deflect laundry 66 away from the bellows assembly 42.

Referring to FIGS. 2-5, as previously explained, the bellows assembly 42 typically includes the folds 70 such that the tub 20 can move separately from the cabinet 14. The folds 70 can be substantially the same around the bellows assembly 42 or may be different in size, shape, number, or other aspects based on the configuration and positioning of the tub 20 relative to the cabinet 14. In various examples, the folds 70 can be substantially sinusoidal-shaped, obliquely sinusoidal-shaped, or other sinusoidal shape proximate at least one of the upper portion 50, side portions 78, and lower portion 82 of the bellows assembly 42. The sinusoidal-shaped folds 70 can include a first fold portion extending a first direction and a second fold portion extending a second opposing direction. The sinusoidal-shaped folds 70 are advantageous for minimizing and/or avoiding self-contact by the bellows assembly 42 when in motion. Reducing self-contact by the bellows assembly 42 reduces friction and surface wear of the bellows assembly 42 that can result therefrom.

The bellows assembly 42 typically has a rear profile that is substantially concentric with the access opening 62. Further, the upper portion 50 of the bellows assembly 42 is generally coupled to the tub 20 at an attachment portion 86 that is spaced-apart from the access opening 62. Accordingly, the bellows assembly 42 are typically offset from the access opening 62 of the tub 20. Further, a clear access aperture 90 defined by the bellows assembly 42 is typically larger than the access opening 62 defined by the tub 20.

For example, a 12 o'clock position 94 of the bellows assembly 42 can be coupled to the tub 20 at the attachment portion 86 and can be spaced-apart from a top portion 98 of the access opening 62. In such examples, the upper portion 50 of the bellows assembly 42 is coupled to the tub 20 in a manner to increase a gap 102 between the folds 70 and the tub 20. Increasing the gap 102 between the bellows assembly 42 and the tub 20 is advantageous for minimizing contact between the bellows assembly 42 and the tub 20 when either is in motion, which reduces surface wear of the bellows assembly 42 as a result.

The lower portion 82 of the bellows assembly 42 can generally align with a bottom portion 106 of the access opening 62 of the tub 20. The folds 70 proximate the lower portion 82 of the bellows assembly 42 are also typically substantially sinusoidal-shaped. The folds 70 proximate the lower portion 82 of the bellows assembly 42 are advantageous for increasing a space 110 between the bellows assembly 42 and the front panel 58 of the cabinet 14. Increasing the space 110 is advantageous for minimizing contact between the cabinet 14 and the bellows assembly 42 when the bellows assembly 42 is in motion, which reduces surface wear of the bellows assembly 42.

In various examples, a 6 o'clock position 114 of the bellows assembly 42 can be disposed adjacent to the bottom portion 106 of the access opening 62 to maintain a watershed feature 116 of the bellows assembly 42. The watershed feature 116 of the bellows assembly 42 allows water that contacts the bellows assembly 42 to drain from the bellows assembly 42 into the tub 20 and/or the drum 22. The lower portion 82 can form a sloping surface to direct liquid into the tub 20 and/or the drum 22 to provide the watershed feature 116. The watershed feature 116 can reduce and/or eliminate other types of drains in the laundry appliance 10 that remove water or other liquid or items from the bellows assembly 42.

Referring still to FIGS. 2-5, the side portions 78 of the bellows assembly 42 can include folds 70. The attachment portions 86, where the side portions 78 of the bellows assembly 42 are coupled to the tub 20, are spaced outside of the access opening 62 to increase the gap 102 between the folds 70 of the bellows assembly 42 and the tub 20. For example, a 3 o'clock position 118 and a 9 o'clock position 122 of the bellows assembly 42 is coupled to the tub 20, such that the bellows assembly 42 concentrically larger than the access opening 62. Accordingly, the clear access aperture 90 defined by the bellows assembly 42 is typically wider than the access opening 62. The increased gap 102 proximate the folds 70 in the side portions 78 of the bellows assembly 42 reduces contact between the bellows assembly 42 and the tub 20 when either or both of the bellows assembly 42 and the tub 20 are in motion to reduce surface wear of the bellows assembly 42. The bellows assembly 42, as described herein, may be utilized with a hinged-type door 26, as illustrated in FIG. 2, and/or with a sliding-type door 26 as illustrated in FIGS. 8-22. The sinusoidal bellows assembly 42 is configured to reduce self-contact of the bellows assembly 42, as well as reduce contact with the tub 20 and the cabinet 14.

Figure 6:
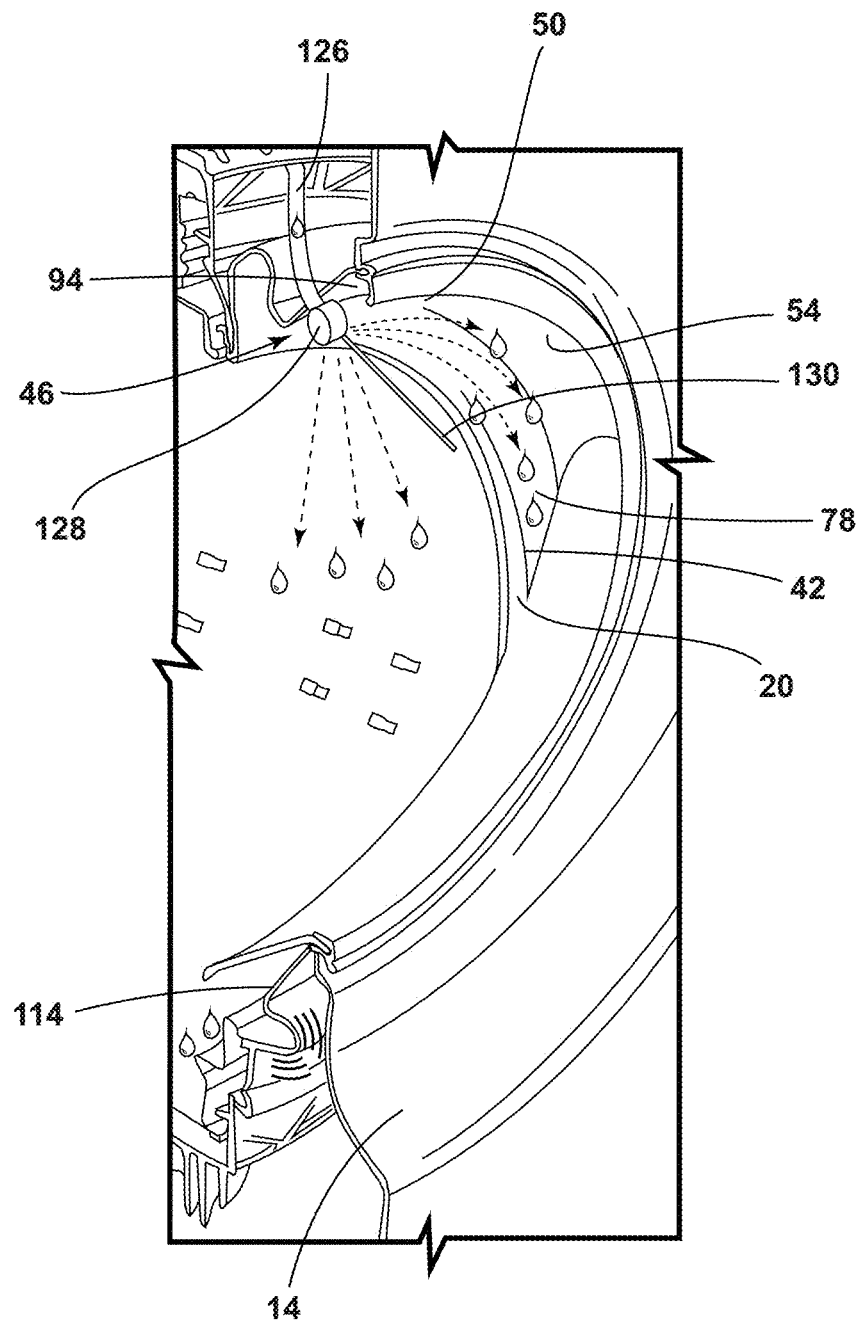
FIG. 6 is a schematic partial cross-sectional perspective view of the laundry appliance of FIG. 2 taken along line VI-VI.
Figure 7:
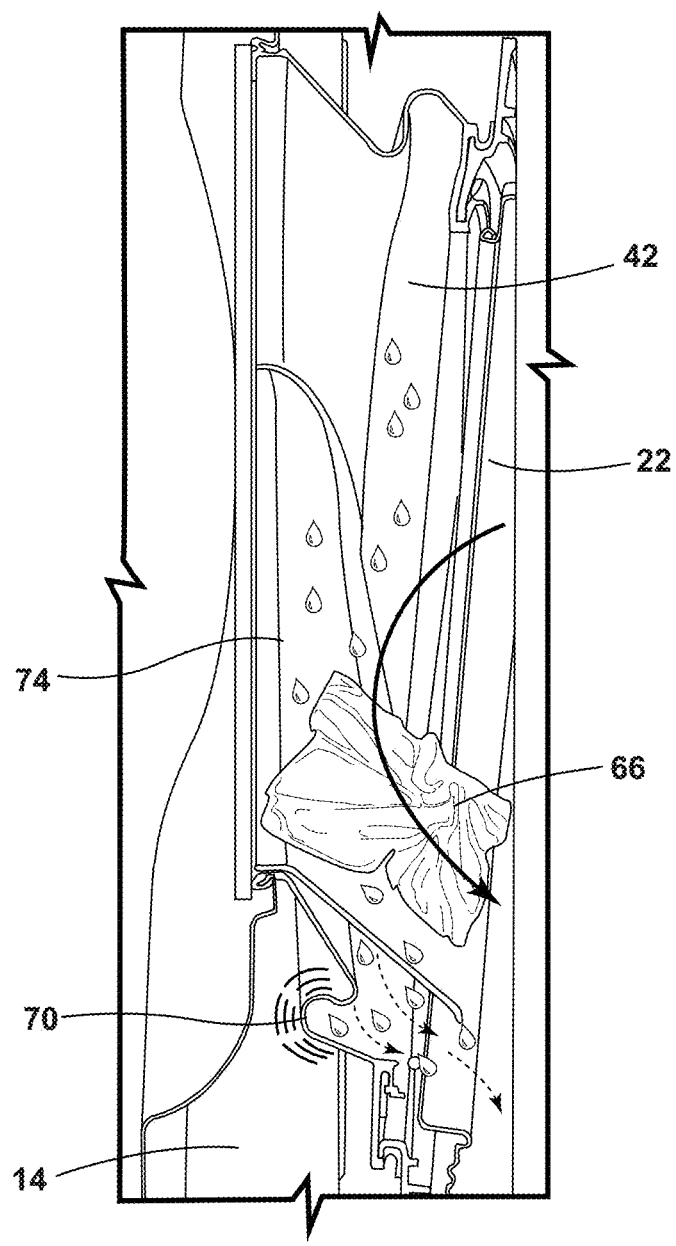
FIG. 7 is a schematic cross-sectional view of the bellows assembly of FIG. 3 showing operation of the bellows wash assembly.

Referring to FIGS. 1, 6, and 7, the laundry appliance 10 may include the bellows wash assembly 46. The bellows wash assembly 46 typically includes at least one inlet 126 for inserting liquid, such as water or cleaning agents, into the tub 20, the drum 22, and/or onto the interior surface 54 of the bellows assembly 42. The inlet 126 can be the primary water inlet of the laundry appliance 10 (e.g., a washer) for providing water to the tub 20, and possibly the drum 22, to wash the laundry 66. The bellows wash assembly 46 can include one or more diverters 130 to direct the liquid from the inlet 126 into different directions. For example, the bellows wash assembly 46 can include two diverters 130 to separate the liquid into two or more streams. For example, the liquid can be provided directly to the tub 20 to wash the laundry 66 and can also be provided to each side portion 78 of the bellows assembly 42. In other words, the liquid can be divided into a central stream and two side streams of water. Other configurations of directing the liquid from the bellows wash assembly 46 are contemplated without departing from the teachings herein.

The bellows wash assembly 46 may include one inlet 126 and one diverter 130 to divide the liquid into at least two streams of liquid flowing down the opposing side portions 78 of the bellows assembly 42. Additionally or alternatively, the bellows wash assembly 46 can include at least one additional inlet 126 (e.g., at least two inlets 126). In such examples, the bellows wash assembly 46 can include two inlets 126, each configured to direct liquid down one corresponding side portion 78 of the bellows assembly 42, respectively. Moreover, separated inlets 126 can dispense different types of liquid (e.g., one for water and one for a cleaning agent).

According to various aspects, the bellows wash assembly 46 can include at least one spray nozzle 128 for directing liquid to the tub 20 and/or to the bellows assembly 42. In various examples, the spray nozzle 128 can operate in conjunction with the diverters 130 to divide the water into streams for the bellows assembly 42 and the tub 20. It is contemplated that the bellows wash assembly 46 can include multiple spray nozzles 128, each configured to direct liquid at a corresponding portion of the bellows assembly 42 and into the tub 20, respectively.

The bellows wash assembly 46 is typically configured to direct liquid in a repeatable pattern over the interior surface 54 of the bellows assembly 42. The inlet 126 is often disposed proximate the upper portion 50 of the bellows assembly 42; however, the one or more inlets 126 may also be disposed elsewhere without departing from the teachings herein. In certain aspects, the inlet 126 is disposed at the upper portion 50, such as proximate the 12 o'clock position 94, of the bellows assembly 42. The inlet 126 and/or the spray nozzle 128 typically direct the liquid over the interior surface 54 of both side portions 78 of the bellows assembly 42 and to the lower portion 82 of the bellows assembly 42. Accordingly, the bellows wash assembly 46 can direct liquid over the interior surface 54 of the bellows assembly 42 from approximately the 12 o'clock position 94 toward approximately the 6 o'clock position 114 where the watershed feature 116 is typically positioned. The liquid may diverge proximate the inlet 126 to flow down both side portions 78 of the bellows assembly 42 and then converge proximate the lower portion 82 of the bellows assembly 42. Accordingly, each stream of liquid can travel approximately 180° around the bellows assembly 42. With the watershed feature 116, the bellows assembly 42 may then direct the liquid into the tub 20 or the drum 22. The liquid typically flows in a continuous pattern that can be repeated when the liquid is dispensed from the inlet 126 of the bellows wash assembly 46. In examples where the laundry appliance 10 includes the deflector 74, the liquid from the bellows wash assembly 46 may flow under the deflector 74 along the lower portion 82 with the watershed feature 116 of the bellows assembly 42. Additional diverters 130 can be included to direct liquid onto a top surface of the deflector 74.

The flow of liquid stays on the bellows assembly 42 by surface adhesion of the liquid, the shape of the bellows assembly 42, the folds 70, and/or centrifugal force. The bellows wash assembly 46 is advantageous for washing the bellows assembly 42. More specifically, the bellows wash assembly 46 is advantageous for washing the folds 70 of the bellows assembly 42. The bellows wash assembly 46 can clear laundry materials from the interior surface 54 of the bellows assembly 42. The laundry materials may include lint, dirt, moisture, pooled water, residual laundry chemistry, and/or small items.

Referring still to FIGS. 1, 6, and 7, movement of the tub 20 and/or the cabinet 14 can assist the bellows wash assembly 46 in washing the bellows assembly 42. For example, vibrations of the cabinet 14 during a laundry cycle often cause movement and/or vibrations of the bellows assembly 42. Additionally or alternatively, movement of the tub 20 during a laundry cycle typically causes movement of the bellows assembly 42. The movement and/or vibrations of the bellows assembly 42 generally promote movement of the laundry materials from the bellows assembly 42 into the tub 20 and/or the drum 22. Accordingly, the bellows wash assembly 46, the shape of the bellows assembly 42, and the movement of the bellows assembly 42 can cooperate to provide a wash system for the bellows assembly 42. Additionally, the wash system can be ongoing and automatic and may operate in conjunction with, or independently from, a laundry cycle. The bellows wash assembly 46 can be used in conjunction with the sinusoidal bellows assembly 42. Additionally or alternatively, the bellows wash assembly 46 can be used with a variety of doors 26 that can be included in the laundry appliance 10. For example, the bellows wash assembly 26 can be used with a hinged-type door, a sliding-type door, and/or a sliding and rotating-type door.

Figure 8:
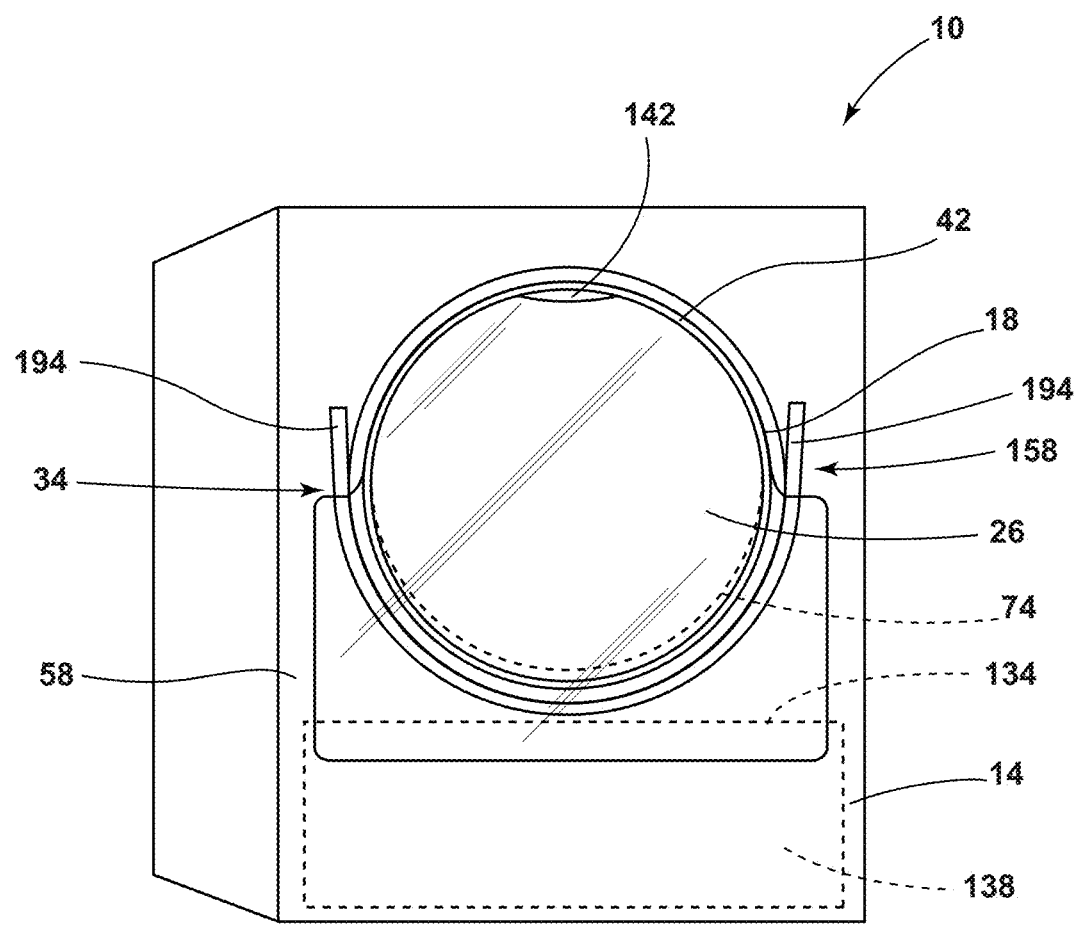
FIG. 8 is a schematic front perspective view of the laundry appliance having a sliding door, according to one example.
Figure 9:
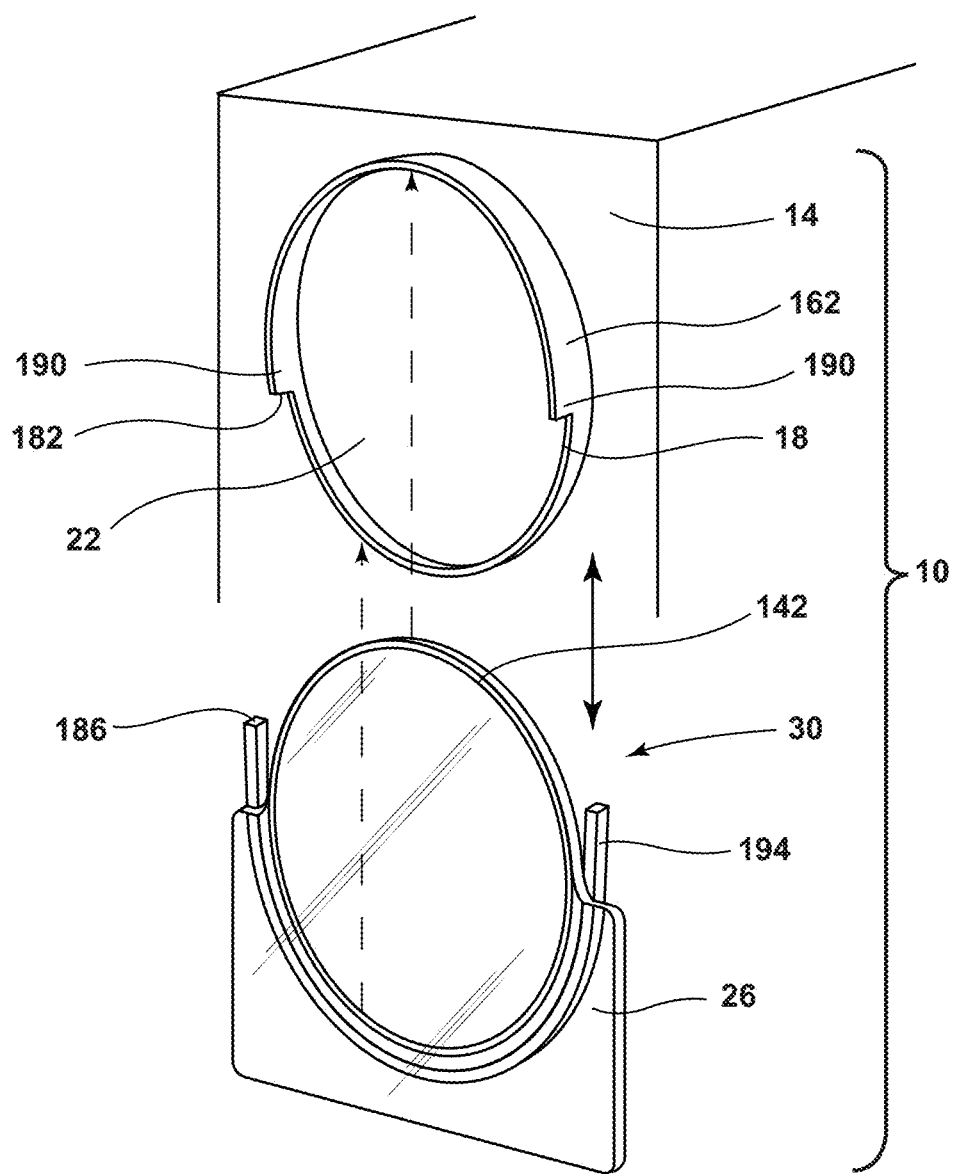
FIG. 9 is a partial schematic exploded view of the laundry appliance of FIG. 8.
Figure 10:
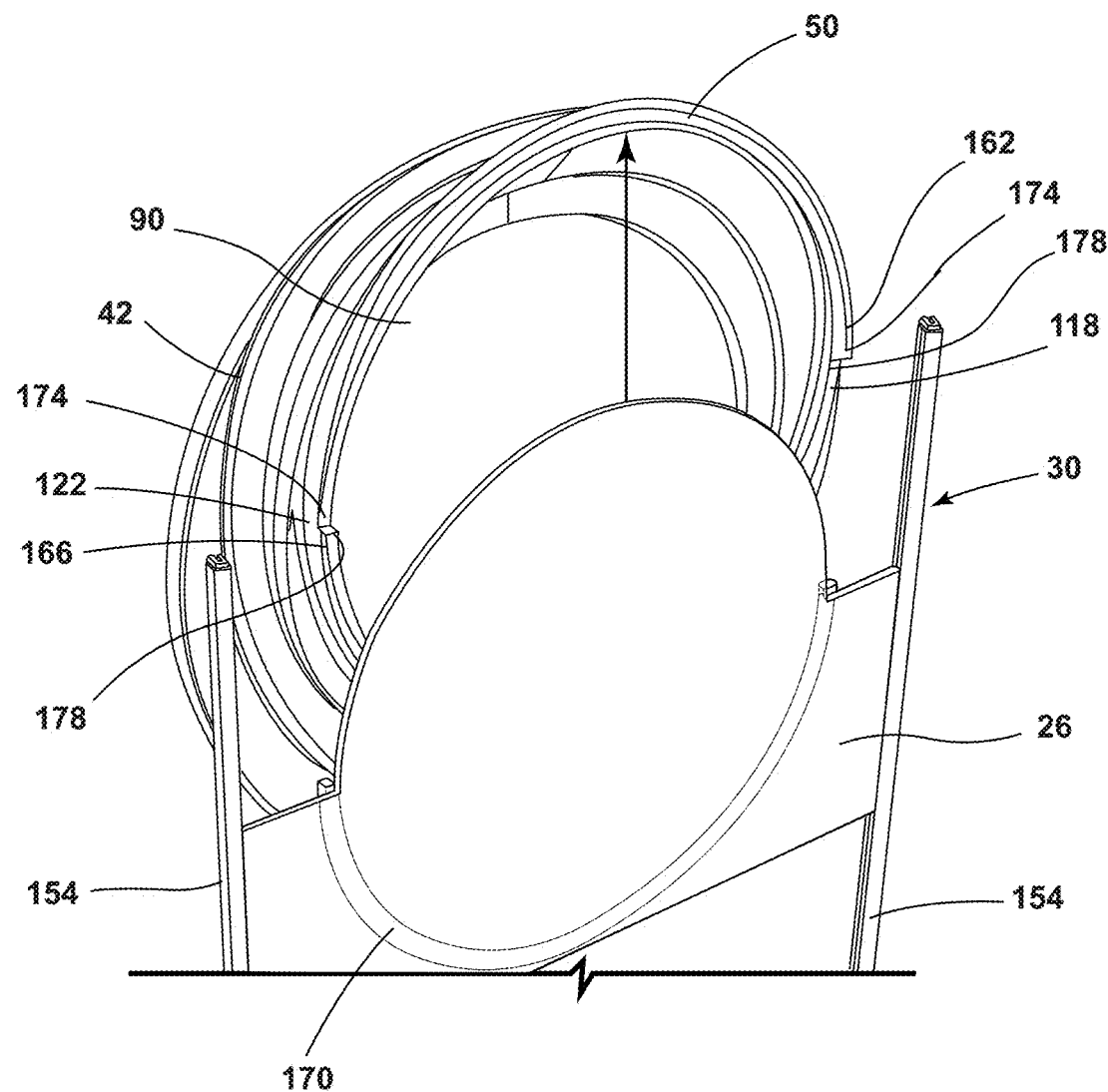
FIG. 10 is a side perspective view of the bellows assembly and the sliding door in the opened position removed from the laundry appliance, according to one example.

Referring to FIGS. 8 and 9, the door 26 of the laundry appliance 10 can be slidably coupled with the cabinet 14. In such examples, the door 26 is typically a substantially flat panel. The door 26 is generally configured to slide from the closed position 34 covering the front opening 18 to a downward location within the cabinet 14 of the laundry appliance 10 (e.g., the opened position 30). In such examples, the cabinet 14 of the laundry appliance 10 typically defines a slot 134 for accessing a chamber 138 positioned proximate to the front panel 58 of the cabinet 14. The door 26 can move through the slot 134 into the chamber 138 when moving to the closed position 34.

The door 26 includes a handle 142 that allows the user to move the door 26 over the front opening 18 and/or into the chamber 138. As illustrated, the closed position 34 (e.g., when the door 26 is positioned over the front opening 18 of the cabinet 14) is a raised position. In such examples, the opened position 30 of the door 26, which provides access to the drum 22, is a lowered position relative to the closed position 34. When the door 26 is in the opened position 30, the door 26 is disposed in the chamber 138 defined by the cabinet 14. As illustrated, the chamber 138 is disposed below the front opening 18, such that a user, or an operating mechanism, can manipulate the door 26 upwards to the closed position 34 over the front opening 18. However, it is contemplated that the chamber 138 can be positioned in another location proximate the front opening 18 and the door 26 can be configured to move sideways and/or downwards to be positioned over the front opening 18. Additionally, the use of the deflector 74 in the laundry appliance 10 can allow for the use of the slidably engaged panel door 26 while providing a function to deflect laundry 66 away from the bellows assembly 42.

The door 26 can be motorized. In such examples, a user can activate a motor to operate the door 26. A control for the motor and/or a motorized door 26 can be incorporated into a user-interface of the laundry appliance 10 or can be a separate or remote controller.

Referring to FIGS. 8-12, the laundry appliance 10 can include rails 154 for sliding the door 26 between the opened and closed positions 30, 34. The rails 154 are typically disposed within the cabinet 14 on opposing sides of the front opening 18. It is contemplated that the laundry appliance 10 can have a single rail 154 or another method for slidably engaging the door 26 with the cabinet 14. The door 26 generally defines any cross-sectional shape that engages the rails 154, or another coupling device, and can seal the front opening 18 of the cabinet 14 while allowing translational movement of the door 26 along the rails 154.

In various examples, the laundry appliance 10 includes a sealing assembly 158 for sealing the front opening 18 with the door 26. The sealing assembly 158 can have a variety of configurations based on the configuration of the door 26 and/or the laundry appliance 10. For example, the sealing assembly 158 typically includes a first seal 162, a second seal 166, and a gasket 170. The first seal 162 can be coupled to at least one of the bellows assembly 42 and the cabinet 14 proximate the front opening 18. The first seal 162 often corresponds with the upper portion 50 of the bellows assembly 42. Additionally or alternatively, the first seal 162 may extend between approximately the 9 o'clock position 122 and approximately the 3 o'clock position 118 of the bellows assembly 42.

The second seal 166 typically corresponds with the lower portion 82 of the bellows assembly 42. The second seal 166 can be coupled to at least one of the bellows assembly 42 and the cabinet 14 proximate the front opening 18. The second seal 166 generally extends between approximately the 3 o'clock position 118 and approximately the 9 o'clock position 122 of the bellows assembly 42.

Accordingly, the first and second seals 162, 166 can both be substantially U-shaped seals. Further, the first and second seals 162, 166 align to form a substantially circular or oblong seal around the clear access aperture 90 defined by the bellows assembly 42. In various examples, first seal ends 174 may be spaced-apart or offset from second seal ends 178. Alternatively, the first seal ends 174 and the second seal ends 178 can mate to provide a continuous seal around the front opening 18. In a non-limiting example, the first seal ends 174 and the second seal ends 178 may overlap or abut one another. Moreover, the first seal ends 174 typically define first mating interfaces 182 configured to align and abut second mating interfaces 186 defined by the gasket 170.

In various examples, as illustrated in FIGS. 8 and 9, the sealing assembly 158 includes the gasket 170 as a separate component coupled to the door 26. The gasket 170 can be configured to form a watertight seal with the first seal 162. The first seal 162 can extend around the entire front opening 18 of the cabinet 14, such that the sealing assembly 158 may be free of the second seal 166. The first seal 162 can define notches 190 having the first mating interface 182 configured to abut the second mating interfaces 186 of the gasket 170. The gasket 170 can engage the first seal 162, the bellows assembly 42, and/or the cabinet 14 to form a watertight seal around the front opening 18.

Referring still to FIGS. 8-12, an inner surface 196 of the door 26 may include the gasket 170. In examples without the second seal 166, the gasket 170 is configured to align with a bottom half of the first seal 162 and/or the lower portion 82 of the bellows assembly 42. In examples having both the first and second seals 162, 166, the gasket 170 is configured to align with the second seal 166 and abut the first seal 162. The gasket 170 can abut the second seal 166 to form a watertight seal therebetween. In various examples, the gasket 170 is substantially U-shaped. The U-shaped gasket 170 is typically disposed substantially on the door 26.

The gasket 170 can include opposing gasket ends 194 that extend beyond opposing outer edges 198 of the door 26. The gasket ends 194 extend from the inner surface 196 of the door 26 and can extend into the cabinet 14 adjacent to the drum 22. The extended gasket ends 194 are advantageous for collecting any liquid that may travel through the first and second seals 162, 166 proximate the side portions 78 of the bellows assembly 42. The liquid can then be guided to a storage or a recirculation system of the laundry appliance 10. The gasket 170 is typically formed similarly to the first and second seals 162, 166. Additionally or alternatively, the gasket 170 may be a surface texture applied to the door 26 and/or may be a material applied to the door 26. In various examples, the gasket 170 defines the second mating interface 186 at, or proximate, each of the gasket ends 194. The first and second mating interfaces 182, 186 can abut one another and/or interlock to form a substantially watertight seal around the front opening 18 of the cabinet 14. Additionally, the sealing assembly 158 having the various seal components can form a non-contact seal, which is advantageous for reducing friction and, as a result, reducing wear on the sealing assembly 158. Each of the first and second seals 162, 166 and the gasket 170 typically includes rubber materials or other similar resiliently and/or elastically compressible materials.

Figure 12:
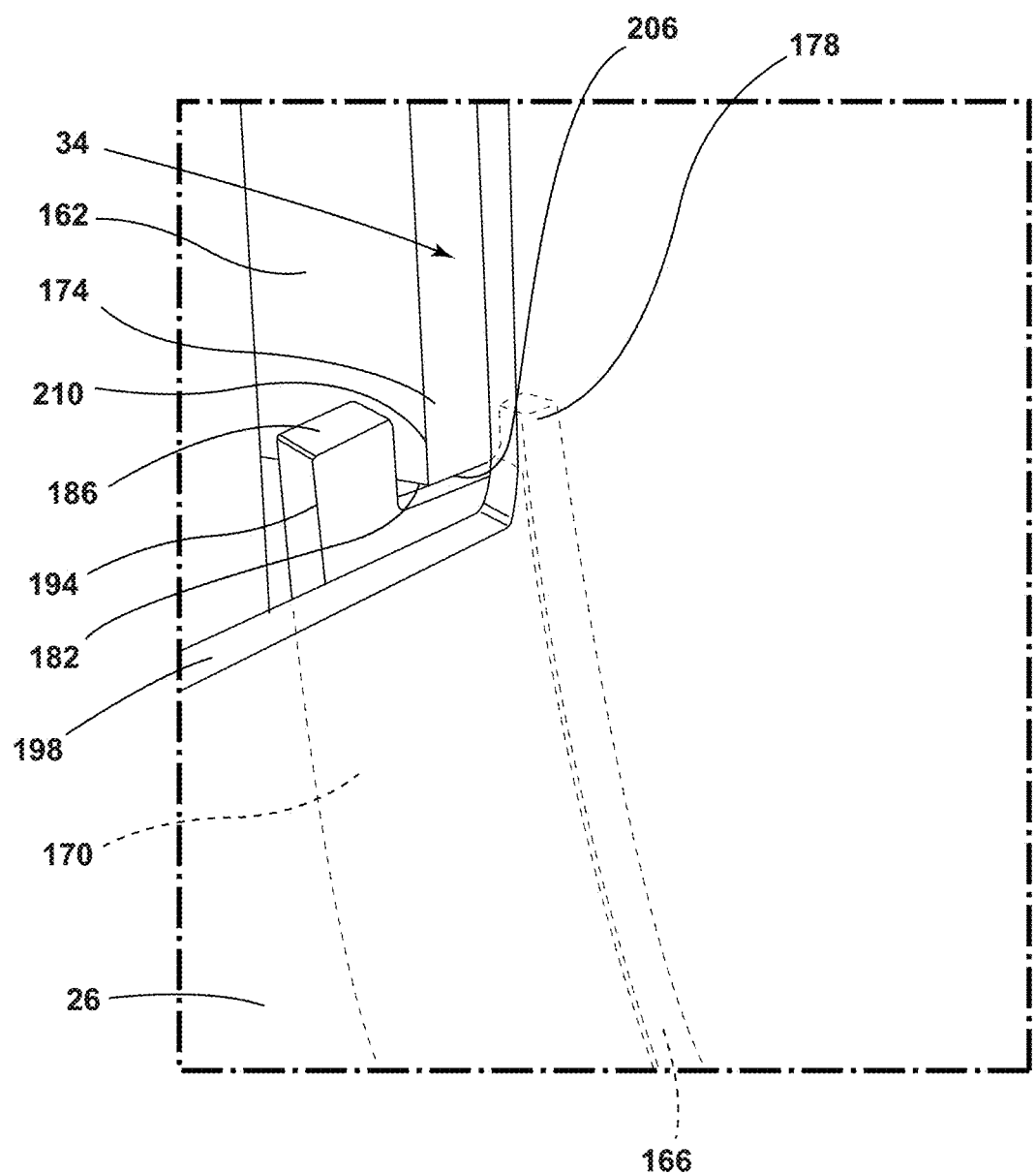
FIG. 12 is an enlarged view of a sealing assembly, taken at area XII of FIG. 11.

Referring to FIG. 12, the second seal 166 is often disposed interior of the first seal 162.

The gasket 170 can be disposed outwardly of the second seal 166 and align with the first seal 162. The gasket 170 can also extend outwardly from the first seal 162. Accordingly, the gasket 170 may contact at least one surface of the first seal 162. As illustrated, the gasket 170 contacts at least two surfaces, a bottom surface 206 and a side surface 210, of the first seal 162. The second mating interface 186 defined by the gasket 170 can define any shape configured to correspond with the first mating interface 182 defined by the first seal 162 to form a watertight seal. Accordingly, the gasket 170 generally aligns with the second seal 166 to form a watertight seal along a lower portion of the access opening, and can abut the first seal 162 to form a continuous watertight seal around the perimeter of the access opening 62 (FIG. 8).

Figure 11:
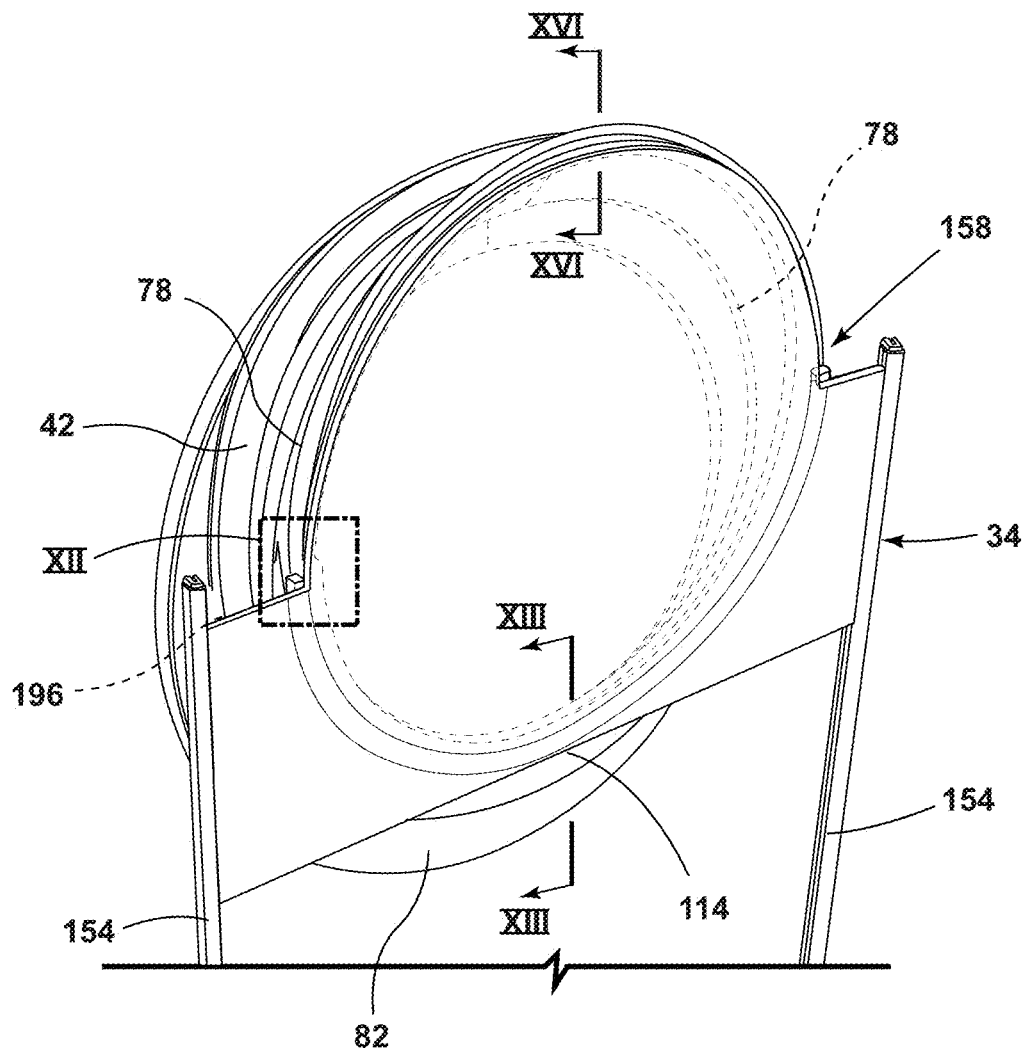
FIG. 11 is a side perspective view of the bellows assembly and the sliding door in the closed position removed from the laundry appliance, according to one example.
Figure 13:
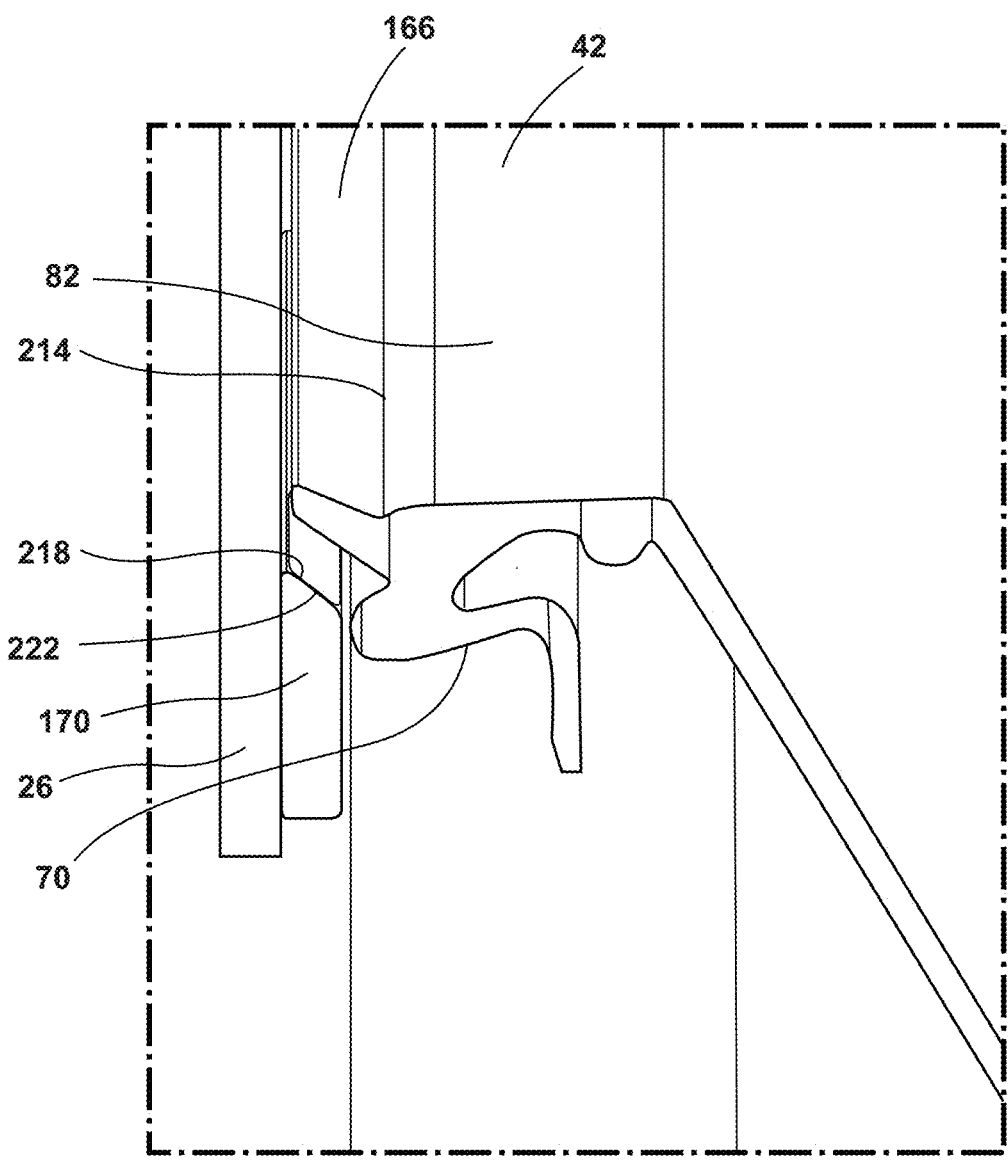
FIG. 13 is a partial cross-sectional view of the bellows assembly and the door of FIG. 11 taken along line XIII-XIII.

Referring to FIGS. 11 and 13, in non-limiting examples, the second seal 166 may be coupled to a front surface 214 of the bellows assembly 42. The bellows assembly 42 can define the folds 70 when the second seal 166 is coupled to the bellows assembly 42. The second seal 166 and the gasket 170 can form first and second mating surfaces 218, 222 proximate the lower portion 82 of the bellows assembly 42. For example, proximate the 6 o'clock position 114 of the bellows assembly 42, the second seal 166 can define the first mating surface 218 and the gasket 170 can define the second mating surface 222. The first and second mating surfaces 218, 222 typically correspond to one another to form a watertight seal when the door 26 is in the closed position 34.

Figure 14:
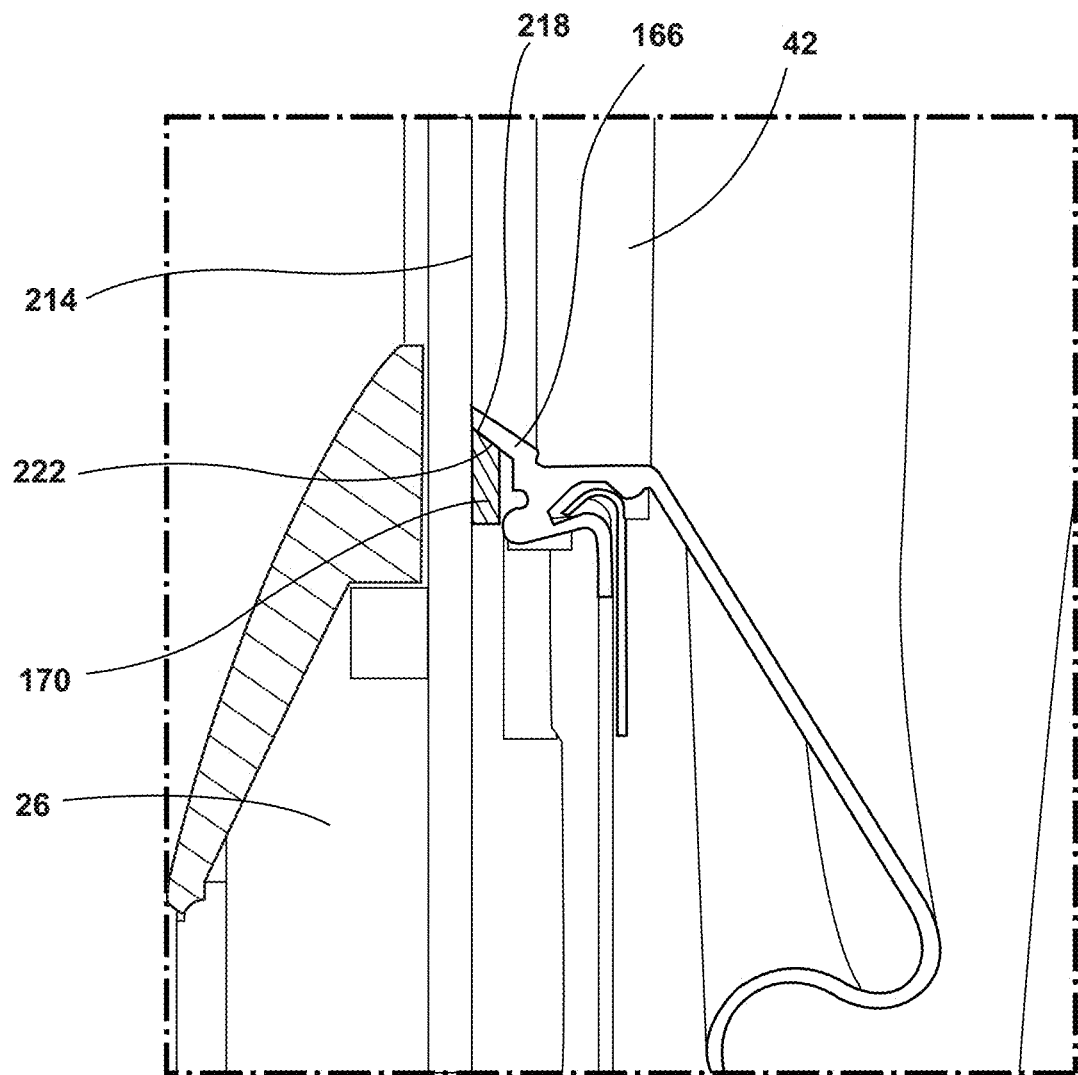
FIG. 14 is a partial cross-sectional view of the bellows assembly and the door of FIG. 13 with a seal of a sealing assembly integrally formed with the bellows assembly.
Figure 15:
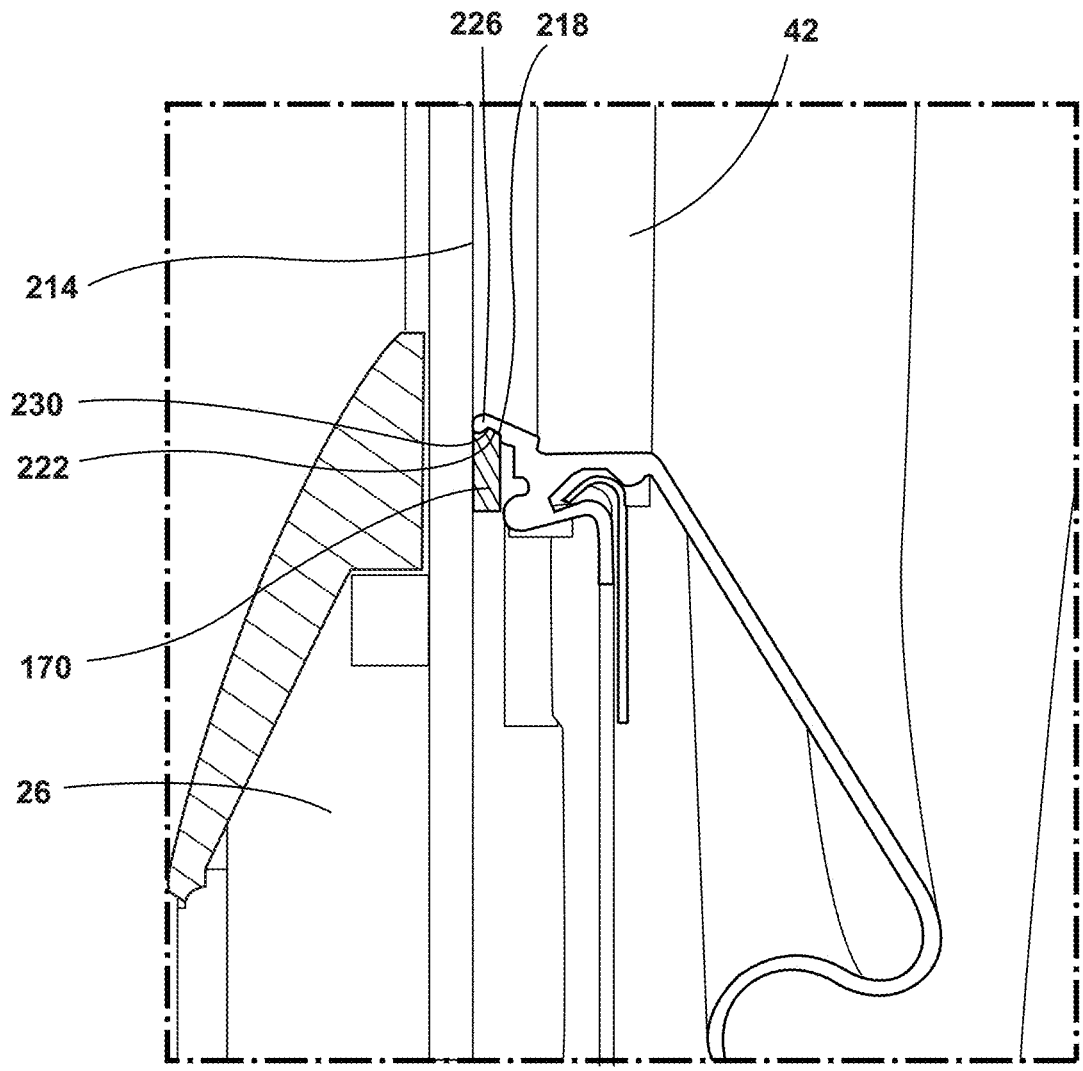
FIG. 15 is a partial cross-sectional view of the bellows assembly and the door of FIG. 14 with the seal having a hook to interlock with a gasket on the door.

Referring to FIGS. 11, 14, and 15, in another non-limiting example, the second seal 166 may be integrally formed with the bellows assembly 42. In such examples, the front surface 214 of the bellows assembly 42 defines the second seal 166. Accordingly, the bellows assembly 42 defines the second seal 166 and also defines the first mating surface 218. The first mating surface 218 of the bellows assembly 42 and the second mating surface 222 of the gasket 170 correspond to form the watertight seal proximate the lower portion 82 of the bellows assembly 42 (e.g., proximate at least the 6 o'clock position 114).

In various examples, the first and second mating surfaces 218, 222 can be angled surfaces, as illustrated in FIG. 14. In additional examples, the first mating surface 218 can define a hook 226 configured to interlock and/or mate with an indent 230 defined by second mating surface 222, as illustrated in FIG. 15. However, it is contemplated that the first and second mating surfaces 218, 222 may be any shapes that correspond with one another to form a watertight seal.

Figure 16:
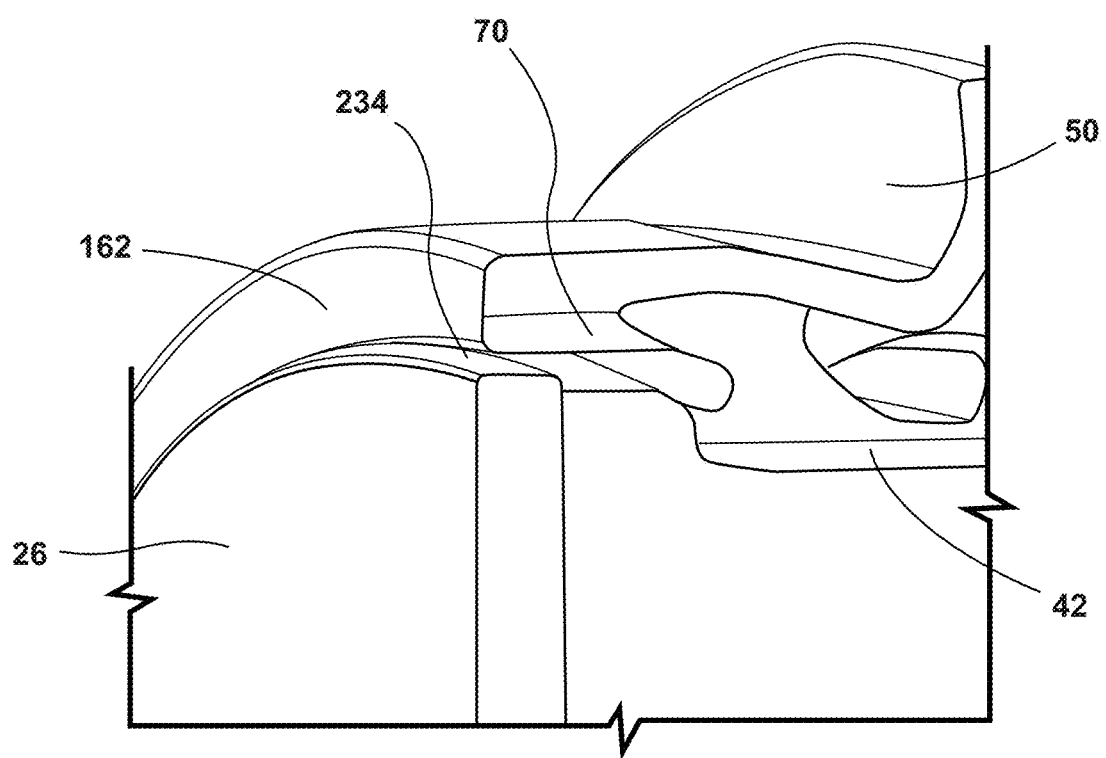
FIG. 16 is a partial cross-sectional view of a door abutting a seal of the bellows assembly, taken along line XVI-XVI of FIG. 11.

Referring to FIGS. 11 and 16, the first seal 162 may also be integrally formed with the bellows assembly 42. In such examples, the first seal 162 is defined by the upper portion 50 (e.g., proximate the 12 o'clock position 94) of the bellows assembly 42. A top edge 234 of the door 26 is typically configured to engage with the first seal 162 to form a watertight seal. In examples where the bellows assembly 42 defines the first seal 162, the bellows assembly 42 typically includes the sinusoidal-shaped folds 70 as discussed previously herein. Having the first and second seals 162, 166 integrally formed with the bellows assembly 42 is advantageous for reducing manufacturing and production costs.

Figure 17:
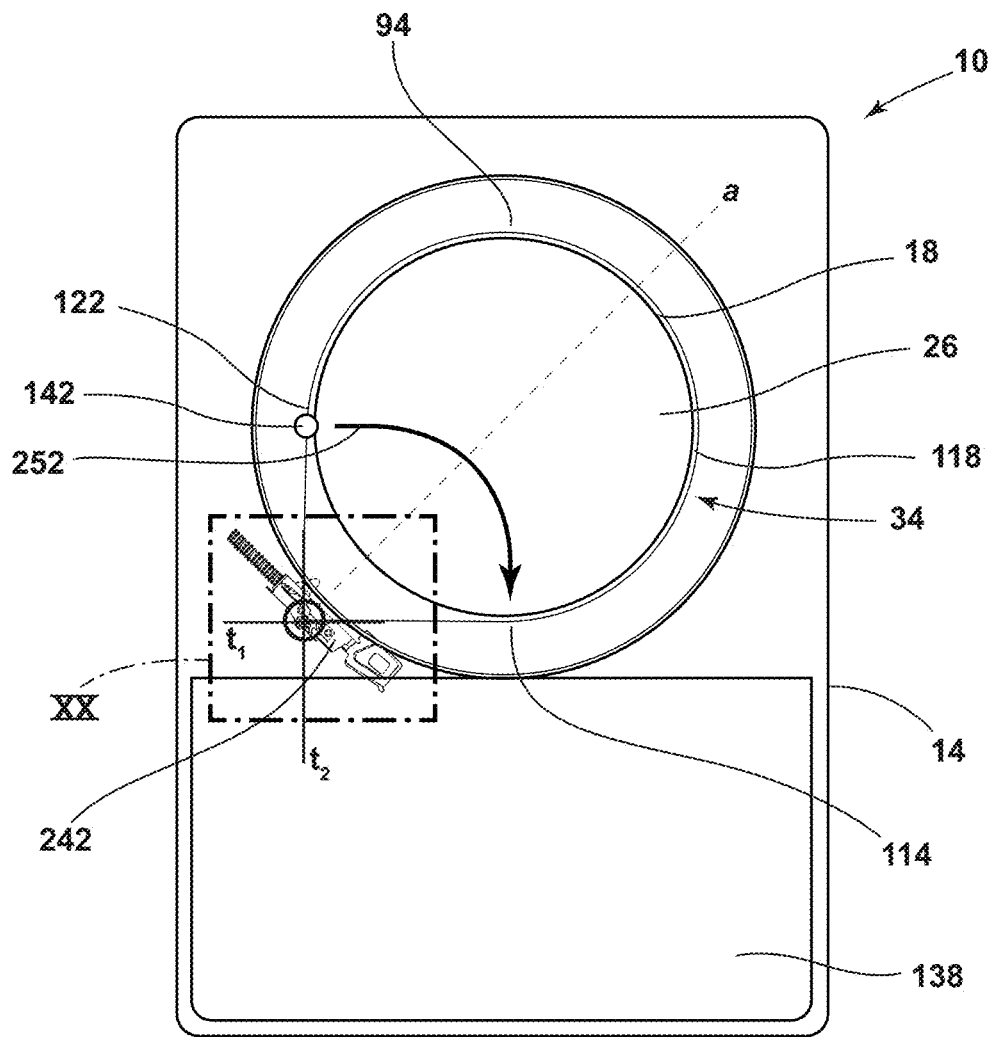
FIG. 17 is a schematic front view of a laundry appliance having a cabinet with a front panel removed and a door in a closed position, according to one example.
Figure 18:
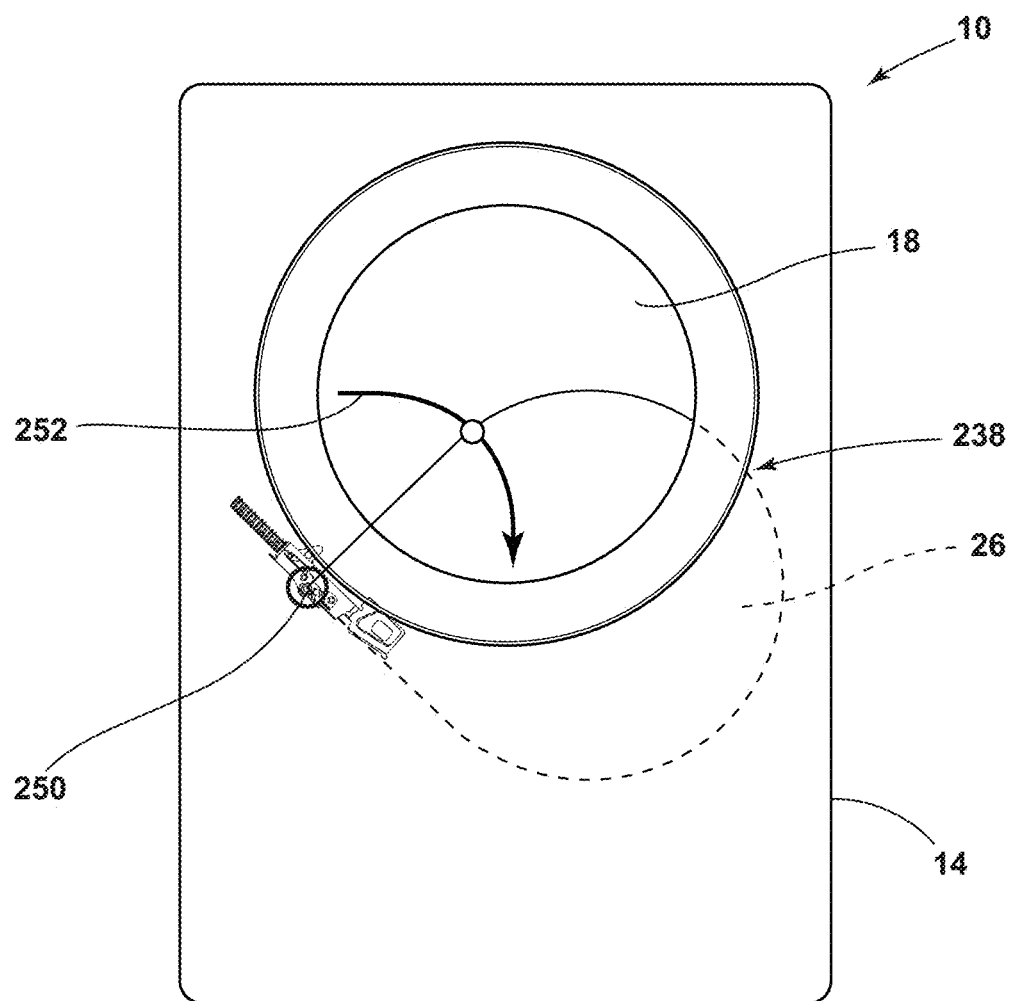
FIG. 18 is a schematic front view of the laundry appliance of FIG. 17 with the door in an intermediate position.
Figure 19:
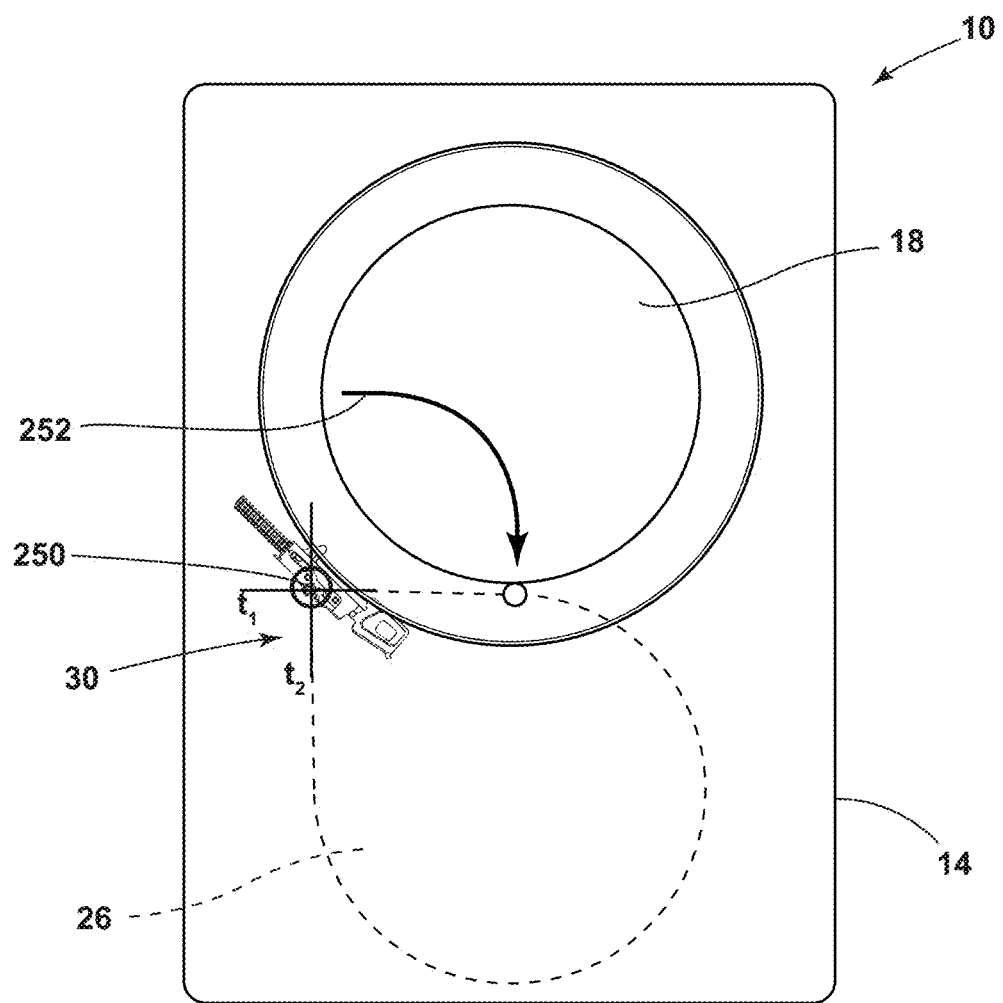
FIG. 19 is a schematic front view of the laundry appliance of FIG. 17 with the door in an opened position.
Figure 20:
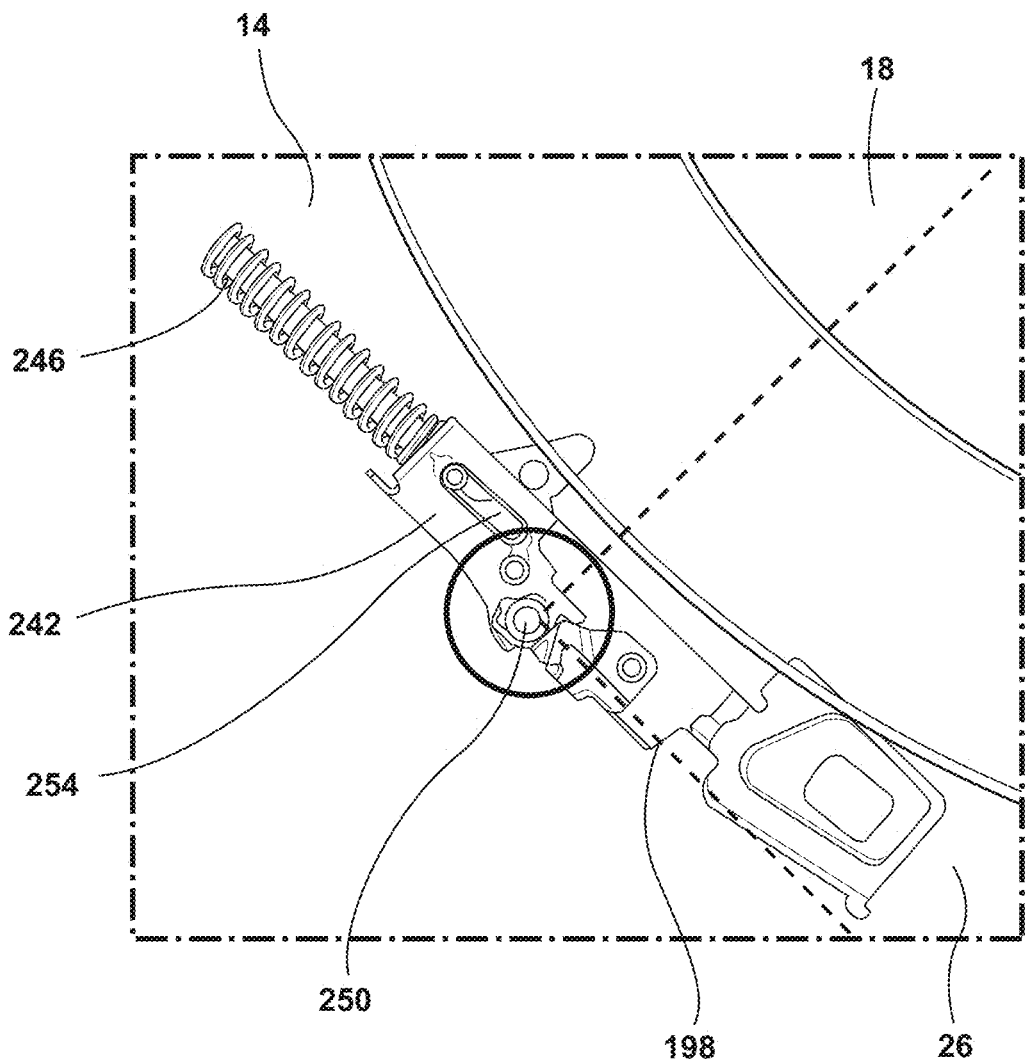
FIG. 20 is an enlarged view of a bracket with a pivot point for the door, taken at area XX of FIG. 17.

With reference to FIGS. 17-19, when configured as a sliding door 26, the door 26 may be operable between the opened and closed positions 30, 34 within the cabinet 14 of the laundry appliance 10. The door 26 can move vertically between the opened and closed positions 30, 34. In various examples, the door 26 can have a substantially circular, oblong, teardrop, or any similar other shapes that covers the front opening 18. Further, the door 26 has a shape that corresponds with a shape of the front opening 18 to cover and seal the front opening 18 when in the closed position 34.

As previously explained, the door 26 may be slidably engaged with the laundry appliance 10 to slide between and be retained in the closed position 34 (FIG. 17) and the opened position 30 (FIG. 19). The door 26 can also be retained in at least one intermediate position 238, as illustrated in FIG. 18, where the door 26 partially covers the front opening 18. The various intermediate positions 238 between the opened and closed positions 30, 34 are advantageous for venting the laundry appliance 10 when the laundry appliance 10 is not in use or when adding laundry 66 mid-cycle.

Additionally or alternatively, the door 26 can be slidably and rotatably coupled with the laundry appliance 10 where the opened and closed positions 30, 34 are both within the cabinet 14 of the laundry appliance 10. As such, the door 26 is typically disposed within the chamber 138 proximate the front opening 18 or otherwise disposed within the cabinet 14 when in the opened position 30. Accordingly, the door 26 can be pivoted about an axis a to follow a circular or arced path 252 to move between the opened and closed positions 30, 34. The arced path 252 is typically oriented along a single vertical plane. The single vertical plane is typically substantially parallel.

Referring to FIGS. 17-20, in various examples, a bracket 242 is coupled to the outer edge 198 of the door 26. The bracket 242 is coupled to the cabinet 14 proximate the front opening 18. The bracket 242 is typically coupled to an inner surface of the cabinet 14 to be concealed from view. The bracket 242 can guide the rotation of the door 26. The bracket 242 typically includes a biasing member 246, which can bias the door 26 in a selected position (e.g., the opened, closed, or intermediate positions 30, 34, 238). Further, the biasing member 246 and the bracket 242 can provide a counter-balancing assembly to assist manual and/or powered movement of the door 26.

According to various aspects, the bracket 242 can include a locking member 254. The locking member 254 is typically configured to retain the door 26 in the opened, closed, and one or more of the intermediate positions 30, 34, 238. Further, the bracket 242 includes a pivot point 250 disposed thereon. The door 26 generally rotates about the pivot point 250 to move between the opened and closed positions 30, 34. Accordingly, the door 26 can be a sliding and rotating door 26.

Referring still to FIGS. 17-20, the bracket 242 is typically disposed between the 6 o'clock position 114 and the 9 o'clock position 122. It is also contemplated that the bracket 242 can be disposed between the 9 o'clock position 122 and the 12 o'clock position 94, the 12 o'clock position 94 and the 3 o'clock position 118, or the 3 o'clock position 118 and the 9 o'clock position 122 without departing from the teachings herein. The positioning of the bracket 242 can differ based on the selected arced path 252, the configuration of the laundry appliance 10, and/or the configuration of the door 26. The positioning of the bracket 242 provides a rotation axis a for the door 26 to fully cover the front opening 18 when in the closed position 34 and not cover the front opening 18 (e.g., be disposed at least partially within the cabinet 14) when in the opened position 30. In non-limiting examples, the door 26 may be entirely removed from the front opening 18 when in the opened position 30.

Figure 21:
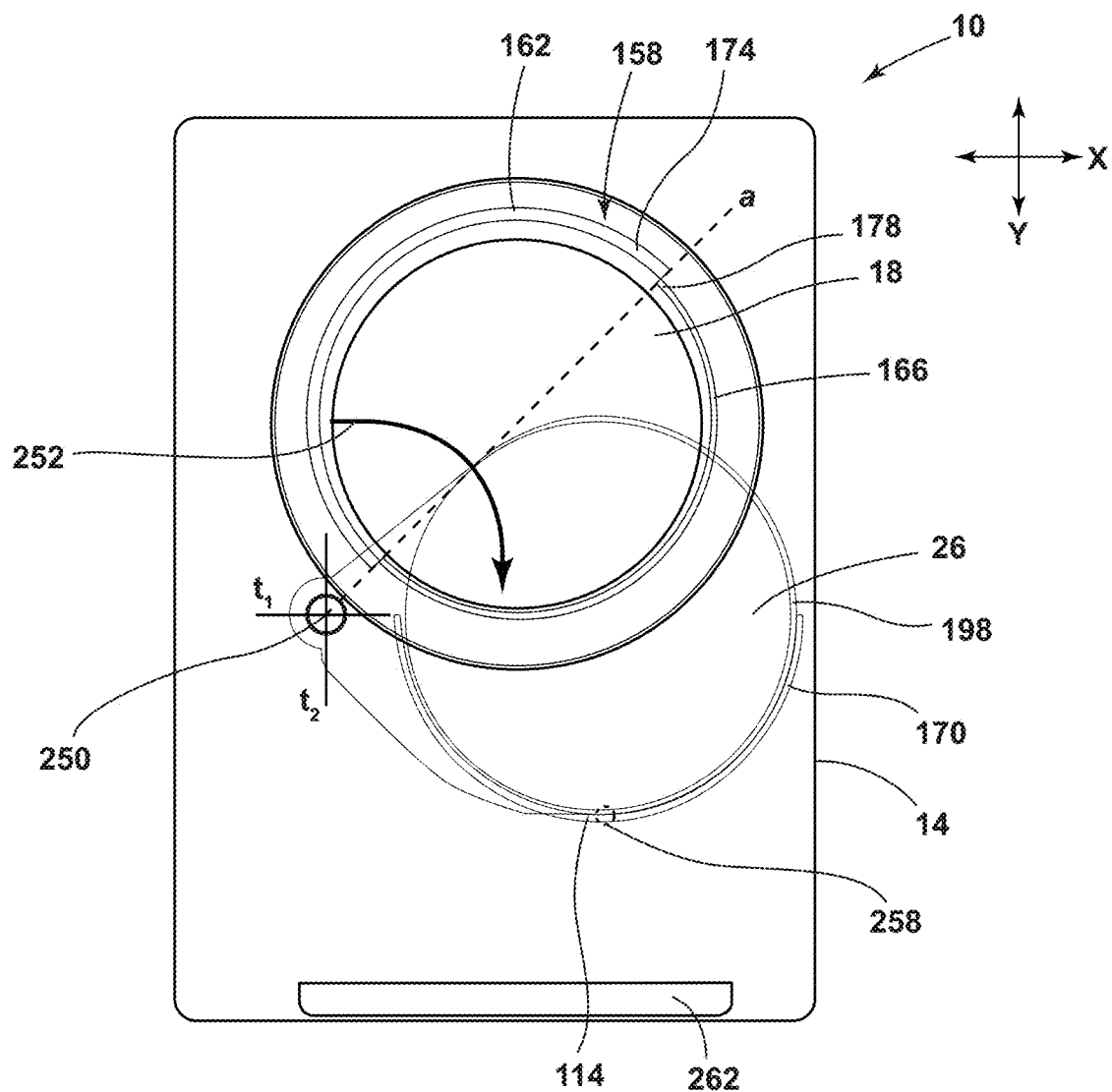
FIG. 21 is a schematic front view of the laundry appliance of FIG. 18 showing a sealing assembly.

Referring to FIGS. 17, 19, and 21, the pivot point 250 and axis a of rotation is typically defined by two intersecting perpendicular lines that are aligned with and/or defined by two tangent lines $t_1$, $t_2$ of the arced path 252 of the door 26 when the door 26 is in the opened and closed positions 30, 34, respectively. Stated differently, a first tangent line $t_1$ is tangent to the arced path 252 when the door 26 is pivoted about the axis a to the opened position 30. The tangent line $t_1$ is tangent to the outer edge 198 of the door 26 when the door 26 is in the raised position.

A second tangent line $t_2$ is tangent to the arced path 252 when the door 26 is pivoted about the axis a to the closed position 34. The tangent line $t_2$ is tangent to the outer edge 198 of the door 26 at the same point when the door 26 is in the lowered position. Each of the tangent lines $t_1$, $t_2$ can form an angle of approximately 45° with the axis a and an angle of approximately 90° with the other tangent line $t_1$, $t_2$. Further, the tangent lines $t_1$, $t_2$ generally extend along an x-axis and a y-axis relative to the front panel 58 of the cabinet 14 of the laundry appliance 10. The substantially perpendicular tangent lines $t_1$, $t_2$ defining the arced path 252 is advantageous for clearing the front opening 18 of the door 26 when the door 26 is in the opened position 30. Further, the perpendicular tangent lines $t_1$, $t_2$ defining the arced path 252 is also advantageous for minimizing the space needed for the chamber 138 defined by the cabinet 14 to house the door 26 when the door 26 is in the opened position 30.

In various examples, the handle 142 of the door 26 can be disposed proximate the outer edge 198 of the door 26. Additionally, the handle 142 is typically disposed in a position such that the handle 142 is accessible to the user when the door 26 is disposed in the chamber 138 in the closed position 34. Accordingly, as illustrated in FIG. 17, the handle 142 can be disposed proximate the 9 o'clock position 122 when the door 26 is in the closed position 34. Having the handle 142 in this position provides access to the handle 142 when the door 26 is in the opened position 30 and the closed position 34.

Referring to FIGS. 17, 19, and 21, the laundry appliance 10 including the slidable and rotatable door 26 can also include the sealing assembly 158 for creating a watertight seal about the front opening 18. In various examples, the sealing assembly 158 aligns with the axis a. In such examples, the first seal 162 is typically disposed on a first side of the axis a and the second seal 166 is typically disposed on a second opposing side of the axis a. Accordingly, the first and second seals 162, 166 are substantially mirror images of one another across the axis a. The gasket 170 can be configured to align and mate with the second seal 166. As such, the gasket 170 is typically disposed on the second side of the axis a when the door 26 is in the closed position 34 and configured to align with the second seal 166. Further, a portion of the door 26 may not include the gasket 170, and therefore the outer edge 198 of the door 26 can engage with the first seal 162 when the door 26 is in the closed position 34, as previously explained herein. Additionally, the first and second seals 162, 166 and the gasket 170 cooperate in a similar manner as discussed previously herein to provide a watertight seal for the laundry appliance 10.

Figure 22:
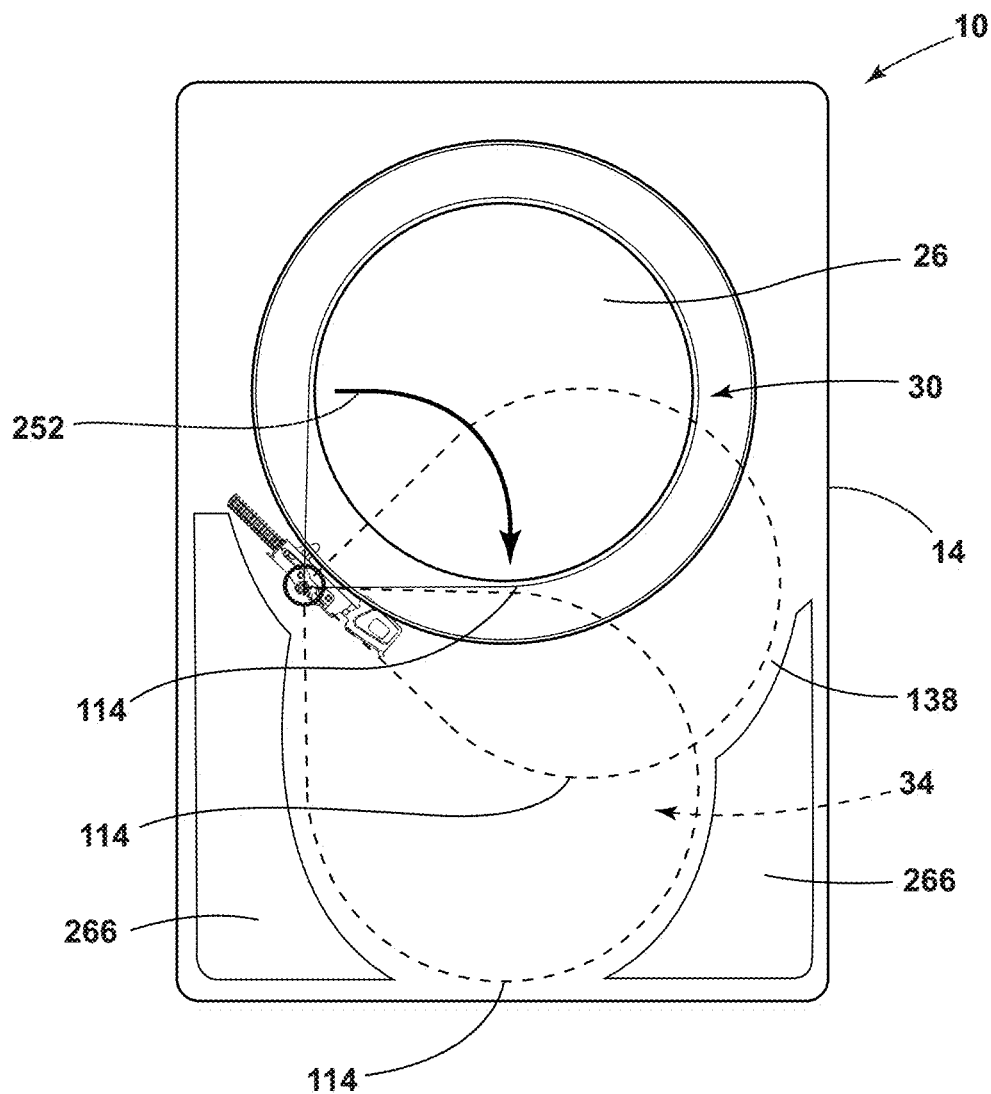
FIG. 22 is a schematic front view of the laundry appliance of FIG. 17 showing a path of movement of the door between the opened and closed positions.

Referring to FIGS. 21 and 22, when in the opened position 30, the door 26 is typically at least partially concealed by the cabinet 14 of the laundry appliance 10. The cabinet 14 often defines the chamber 138 for housing the door 26. Alternatively, the laundry appliance 10 may not include the chamber 138, and the door 26 can be disposed within the cabinet 14 when in the opened position 30. In various examples, the chamber 138 aligns with the arced path 252. Accordingly, storage areas 266 can be disposed within the cabinet 14 adjacent to the arced path 252. The storage areas 266 can house other machinery and/or mechanics of the laundry appliance 10. The size and/or shape of the storage areas 266 may be determined by the arced path 252. As illustrated in FIG. 21, one storage area 266 is disposed on each side of the arced path 252. However, it is contemplated that there can be a single storage area 266 disposed on a single side of the arced path 252, no storage areas 266, or any other practicable configuration.

Additionally or alternatively, the laundry appliance 10 can include a drip container 262 disposed within the chamber 138 or otherwise disposed below the door 26 and/or the arced path 252 of the door 26 within the cabinet 14. The geometry of the door 26 typically provides a liquid management feature for residual liquid. The door 26 includes a low point 258 where a liquid is directed from the door 26 into the drip container 262. The position of the low point 258 of the door 26 differs based on the position of the door 26. However, in relation to the front opening 18, the low point 258 may remain at approximately the 6 o'clock position 114. As the door 26 pivots, the position on the door 26 that corresponds with the 6 o'clock position 114 changes, resulting in the change of the low point 258 relative to the door 26.

Use of the present disclosure provides a variety of advantages. For example, the sinusoidal folds 70 of the bellows assembly 42 reduce self-contact of the bellows assembly 42, which reduces surface wear of the bellows assembly 42. Further, the sinusoidal folds 70 reduce contact between the bellows assembly 42 and the tub 20 and/or the cabinet 14 to reduce surface wear of the bellows assembly 42. Additionally, the bellows wash assembly 46 provides an automatic and/or ongoing washing function of the bellows assembly 42. The bellows wash assembly 46 removes laundry material from the bellows assembly 42 that can result in premature wear of the bellows assembly 42. Moreover, the bellows wash assembly 46 can be used with or without the deflector 74 in the laundry appliance 10. Also, the laundry appliance 10 includes the sealing assembly 158 for providing a watertight seal in conjunction with the sliding door 26. The sealing assembly 158 can be a non-contact seal that reduces friction and, accordingly, reduces wear on the sealing assembly 158. Moreover, the door 26 can be configured to slide and rotate through a vertical plane. Additional benefits or advantages of using this device may also be realized and/or achieved.

According to one aspect of the present disclosure, a laundry appliance includes a cabinet that has a front panel. A tub is positioned within the cabinet. A door is coupled to the front panel of the cabinet. The door moves vertically between a closed position and an opened position. A bellows assembly is coupled to the front panel. The bellows assembly extends between the cabinet and the tub. A sealing assembly includes a first seal and a second seal that are each coupled to the bellows assembly.

According to another aspect, a door includes a gasket. The gasket is configured to align with a second seal when the door is in a closed position.

According to another aspect, a first seal includes a first mating interface. A gasket includes a second mating interface. The first and second mating interfaces align with one another when a door is in a closed position to form a watertight seal.

According to another aspect, a gasket is disposed on an inner surface of a door. The gasket includes opposing ends that extend beyond an outer edge of the door.

According to another aspect, a first seal is coupled to a cabinet and extends around a first portion of a front opening defined by a front panel. A second seal is coupled to the cabinet and extends around a second portion of the front opening.

According to another aspect, a bellows assembly defines a sinusoidal-shaped fold having a first fold portion and a second fold portion.

According to another aspect, a bellows wash assembly is disposed proximate an upper portion of the bellows assembly. The bellows wash assembly is configured to dispense water along an interior surface of the bellows assembly.

According to another aspect, a bracket is coupled to a front panel and a door. The door is configured to vertically rotate along a single plane between opened and closed positions.

According to another aspect of the present disclosure, a laundry appliance includes a cabinet that defines a front opening in a front panel thereof. A tub is disposed within the cabinet. A bracket is coupled to the front panel proximate the front opening. A door is rotatably coupled to the cabinet via the bracket. The door is operable along an arced path through a single plane between opened and closed positions. The single plane is parallel to the front panel.

According to another aspect, an arced path defines an opened position and a closed position. A door fully covers a front opening when in the closed position and is fully removed from the front opening when in the opened position.

According to another aspect, a door rotates about an axis of rotation. An axis of rotation is defined between a first tangent line and a second tangent line, the first and second tangent lines being perpendicular to one another.

According to another aspect, a first tangent line is tangent to an outer edge of a door when the door is in a closed position. A second tangent line is tangent to the outer edge of the door when the door is in the opened position.

According to another aspect, a cabinet defines a chamber. A door is at least partially disposed within the chamber when the door is in an opened position.

According to another aspect, a sealing assembly is coupled to a door and a cabinet. The sealing assembly is configured to form a watertight seal when the door is in a closed position.

According to another aspect, a sealing assembly includes a first seal coupled to the bellows assembly, a second seal coupled to the bellows assembly, and a gasket coupled to an inner surface of a door. The gasket is configured to mate with the first seal when the door is in a closed position.

According to another aspect, a bellows assembly defines a sinusoidal-shaped fold having a first fold portion and a second fold portion. The first fold portion and a cabinet define a space therebetween. The second fold portion and a tub define a gap therebetween.

According to another aspect of the present disclosure, a laundry appliance includes a cabinet. A tub is positioned within the cabinet. A bellows assembly extends between the cabinet and the tub. A bellows wash assembly is disposed proximate an upper portion of the bellows assembly. The bellows wash assembly is configured to dispense water on an interior surface of the bellows assembly.

According to another aspect, a gasket is coupled to an inner surface of a door. A bellows assembly defines a seal in a lower portion thereof configured to mate with the gasket when the door is in a closed position.

According to another aspect, a door is at least one of a sliding panel door and a rotating panel door.

According to another aspect, a drum disposed within a tub. A bottom portion of a bellows assembly defines a sloping surface to direct liquid into a drum.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A laundry appliance, comprising:
    a cabinet defining a front opening in a front panel thereof;
    a tub disposed within the cabinet;
    a bracket coupled to the front panel proximate the front opening; and
    a door rotatably coupled to the cabinet via the bracket, wherein the door is operable along an arced path through a single plane between opened and closed positions, wherein the single plane is parallel to the front panel.

2. The laundry appliance of claim 1, wherein the arced path defines the opened position and the closed position, and wherein the door fully covers the front opening when in the closed position and is fully removed from the front opening when in the opened position.

3. The laundry appliance of claim 1, wherein the door rotates about an axis of rotation, and wherein the axis of rotation is defined between a first tangent line and a second tangent line, the first and second tangent lines being perpendicular to one another.

4. The laundry appliance of claim 3, wherein the first tangent line is tangent to an outer edge of the door when the door is in the closed position, and wherein the second tangent line is tangent to the outer edge of the door when the door is in the opened position.

5. The laundry appliance of claim 1, wherein the cabinet defines a chamber, and wherein the door is at least partially disposed within the chamber when the door is in the opened position.

6. The laundry appliance of claim 1, further comprising:
    a sealing assembly coupled to the door and the cabinet, wherein the sealing assembly is configured to form a watertight seal when the door is in the closed position.

7. The laundry appliance of claim 6, wherein the sealing assembly includes a first seal coupled to the bellows assembly, a second seal coupled to the bellows assembly, and a gasket coupled to an inner surface of the door, and further wherein the gasket is configured to mate with the first seal when the door is in the closed position.

8. The laundry appliance of claim 1, wherein the bellows assembly defines a sinusoidal-shaped fold having a first fold portion and a second fold portion, and wherein the first fold portion and the cabinet define a space therebetween, and further wherein the second fold portion and the tub define a gap therebetween.

* * * * *